(12) United States Patent
Wang et al.

(10) Patent No.: US 11,710,828 B2
(45) Date of Patent: Jul. 25, 2023

(54) ELECTROCHEMICAL DEVICES INCLUDING POROUS LAYERS

(71) Applicant: Sion Power Corporation, Tucson, AZ (US)

(72) Inventors: Zhongchun Wang, Sunnyvale, CA (US); David L. Coleman, Corona De Tucson, AZ (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 422 days.

(21) Appl. No.: 16/879,861

(22) Filed: May 21, 2020

(65) Prior Publication Data

US 2020/0373578 A1    Nov. 26, 2020

Related U.S. Application Data

(60) Provisional application No. 62/851,164, filed on May 22, 2019.

(51) Int. Cl.
*H01M 4/62* (2006.01)
*H01M 4/139* (2010.01)
*H01M 10/0525* (2010.01)

(52) U.S. Cl.
CPC ............ *H01M 4/62* (2013.01); *H01M 4/139* (2013.01); *H01M 10/0525* (2013.01)

(58) Field of Classification Search
CPC ..... H01M 4/62; H01M 4/139; H01M 10/0525
See application file for complete search history.

(56) References Cited

U.S. PATENT DOCUMENTS

| 4,664,991 A | 5/1987 | Perichaud et al. |
| 4,739,018 A | 4/1988 | Armand et al. |
| 4,833,048 A | 5/1989 | Dejonghe et al. |

(Continued)

FOREIGN PATENT DOCUMENTS

| WO | WO 99/33125 A1 | 7/1999 |
| WO | WO 99/33130 A1 | 7/1999 |

(Continued)

OTHER PUBLICATIONS

Li et al., Interface Design and Development of Coating Materials in Lithium-Sulfur Batteries, Advanced Functional Materials, vol./Issue 28, pp. 1-21 (Year: 2018).*

(Continued)

*Primary Examiner* — Jayne L Mershon
(74) *Attorney, Agent, or Firm* — Wolf, Greenfield & Sacks, P.C.

(57) ABSTRACT

Electrochemical devices that include porous layers, and associated methods, are generally described. In certain cases, the electrochemical device includes a first layer (e.g., a porous coating containing nanoparticles) between an anode and a separator, and a second layer (e.g., another porous coating containing nanoparticles) between a cathode and the separator. The first layer and/or the second layer may have a relatively high porosity, even after the application of an applied pressure to the electrochemical device. The presence of the first layer and the second layer in the electrochemical device may mitigate the occurrence of certain problematic phenomena during cycling of the electrochemical device.

17 Claims, 12 Drawing Sheets

(56) References Cited

U.S. PATENT DOCUMENTS

| | | |
|---|---|---|
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,238,821 B1 | 5/2001 | Mukherjee et al. |
| 6,306,545 B1 | 10/2001 | Carlson et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito et al. |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0316072 A1 | 11/2013 | Scordilis-Kelley et al. |
| 2014/0272565 A1 | 9/2014 | Gronwald et al. |
| 2014/0272594 A1 | 9/2014 | Safont Sempere et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0162586 A1 | 6/2015 | Fleischmann et al. |
| 2015/0188194 A1 | 7/2015 | Mikhaylik et al. |
| 2015/0236322 A1 | 8/2015 | Laramie et al. |
| 2015/0287986 A1 | 10/2015 | Affinito et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2017/0141385 A1 | 5/2017 | Scordilis-Kelley et al. |
| 2017/0141402 A1 | 5/2017 | Affinito et al. |
| 2017/0338475 A1 | 11/2017 | Laramie et al. |
| 2018/0006303 A1 | 1/2018 | Mikhaylik et al. |
| 2018/0138542 A1 | 5/2018 | Bunte et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0301697 A1 | 10/2018 | Affinito et al. |
| 2018/0337406 A1 | 11/2018 | Mudalige et al. |
| 2018/0351148 A1 | 12/2018 | Schneider et al. |
| 2018/0351158 A1 | 12/2018 | Liao et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0267632 A1 | 8/2019 | Affinito et al. |
| 2019/0348672 A1* | 11/2019 | Wang ............... H01M 4/405 |

(56) References Cited

U.S. PATENT DOCUMENTS

| | | |
|---|---|---|
| 2019/0386334 A1 | 12/2019 | Scordilis-Kelley et al. |
| 2020/0044460 A1 | 2/2020 | Mikhaylik et al. |
| 2020/0091547 A1 | 3/2020 | Scordilis-Kelley et al. |
| 2020/0099108 A1 | 3/2020 | Laramie et al. |
| 2020/0119324 A1 | 4/2020 | Laramie et al. |
| 2020/0185764 A1 | 6/2020 | Liao et al. |
| 2020/0194822 A1 | 6/2020 | Laramie et al. |
| 2020/0220146 A1 | 7/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0227785 A1 | 7/2020 | Mikhaylik et al. |

FOREIGN PATENT DOCUMENTS

| | | |
|---|---|---|
| WO | WO 2016/040461 A1 | 3/2016 |
| WO | WO 2017/222967 A2 | 12/2017 |
| WO | WO 2018/119392 A1 | 6/2018 |
| WO | WO 2019/055303 A2 | 3/2019 |

OTHER PUBLICATIONS

[No Author Listed], Aerosil—Fumed Silica. Technical Overview. Evonik Industries. Parsipanny, NJ. Dec. 2015. 104 pages.

Alamgir et al., "Room Temperature Polymer Electrolytes," Lithium Batteries, New Materials, Developments and Perspectives, Chapter 3, pp. 93-136, Elsevier, Amsterdam (1994).

Bai et al. Transition of lithium growth mechanisms in liquid electrolytes. Energy Environ Sci. 2016;9:3221-9.

Bucur et al. A soft, multilayered lithium-electrolyte interface. Energy Environ Sci. 2016;9:112-6.

Cheng et al. Dendrite-Free Lithium Deposition Induced by Uniformly Distributed Lithium Ions for Efficient Lithium Metal Batteries. Adv Mater. 2016;28(15):2888-2895.

Cheng et al. Dual-Phase Lithium Metal Anode Containing a Polysulfide-Induced Solid Electrolyte Interphase and Nanostructured Graphene Framework for Lithium-Sulfur Batteries. ACS Nano. 2015;9(6):6373-6382.

Dominey, "Current State of the Art on Lithium Battery Electrolytes," Lithium Batteries, New Materials, Developments and Perspectives, Chapter 4, pp. 137-165, Elsevier, Amsterdam (1994).

Fu et al. Flexible, solid-state, ion-conducting membrane with 3D garnet nanofiber networks for lithium batteries. Proc Natl Acad Sci U S A. 2016;113(26):7094-7099.

Han et al. Microstructure evolution of fumed silica compacts during compression, thermal treatment and doping process. Mater Res Innov. 2014;18:S2-255-9. Epub May 30, 2014.

Li et al. Suppressing Dendritic Lithium Formation Using Porous Media in Lithium Metal-Based Batteries. Nano Lett. 2018;18(3):2067-2073. Includes Supporting Information.

Liang et al. Polymer nanofiber-guided uniform lithium deposition for battery electrodes. Nano Lett. 2015;15(5):2910-2916. Includes Supporting Information.

Lu et al. Stable lithium electrodeposition in liquid and nanoporous solid electrolytes. Nat Mater. 2014;13(10):961-969.

Luo et al. A Thermally Conductive Separator for Stable Li Metal Anodes. Nano Lett. 2015;15(9):6149-6154. Includes Supporting Information.

Sindhu et al. Generation and characterization of nano aluminium powder obtained through wire explosion process. Bull Mater Sci. Apr. 2007;30(2):187-95.

Xie et al. Dual Functionalities of Carbon Nanotube Films for Dendrite-Free and High Energy-High Power Lithium-Sulfur Batteries. ACS Appl Mater Interfaces. 2017;9(5):4605-4613. Includes Supporting Information.

Zhou et al. SiO2 Hollow Nanosphere-Based Composite Solid Electrolyte for Lithium Metal Batteries to Suppress Lithium Dendrite Growth and Enhance Cycle Life. Adv Energy Mater. Apr. 6, 2016;6(7):1502214.

Zhu et al. Poly(dimethylsiloxane) Thin Film as a Stable Interfacial Layer for High-Performance Lithium-Metal Battery Anodes. Adv Mater. Jan. 11, 2017;29(2):1603755.

* cited by examiner

ELECTROCHEMICAL DEVICES INCLUDING POROUS LAYERS

RELATED APPLICATIONS

This application claims priority under 35 U.S.C. § 119(e) to U.S. Provisional Application No. 62/851,164, filed May 22, 2019, and entitled "Electrochemical Devices Including Porous Layers," which is incorporated herein by reference in its entirety for all purposes.

TECHNICAL FIELD

Electrochemical devices that include porous layers, and associated methods, are generally described.

BACKGROUND

Electrochemical cells typically include electrodes comprising electrode active materials that participate in an electrochemical reaction to produce electric current. Electrochemical cells typically contain an anode and a cathode, and in some cases the electrochemical cells contain one or more layers between the anode and the cathode. Certain embodiments of the present disclosure are directed to inventive methods, systems, and articles for improving the performance of electrochemical devices such as electrochemical cells.

SUMMARY

Electrochemical devices that include porous layers, and associated methods, are generally described. The subject matter of the present invention involves, in some cases, interrelated products, alternative solutions to a particular problem, and/or a plurality of different uses of one or more systems and/or articles.

In one aspect, an electrochemical device is described. In some embodiments, the electrochemical device comprises an anode, a cathode, and a separator between the anode and the cathode. In some embodiments, the electrochemical device comprises a first layer between the anode and the separator, with the first layer comprising a first plurality of nanoparticles. In some embodiments, the electrochemical device comprises a second layer between the cathode and the separator, with the second layer comprising a second plurality of nanoparticles. In some embodiments, at least some of the nanoparticles of the first plurality of nanoparticles are in the form of a branched or chain-like structure, and at least some of the nanoparticles of the second plurality of nanoparticles are in the form of a branched or chain-like structure.

In some embodiments, an electrochemical device is described. In some embodiments, the electrochemical device comprises an anode, a cathode, and a separator between the anode and the cathode. In some embodiments, the electrochemical device comprises a first layer between the anode and the separator, with the first layer comprising a first plurality of nanoparticles. In some embodiments, the electrochemical device comprises a second layer between the cathode and the separator, with the second layer comprising a second plurality of nanoparticles. In some embodiments, the first plurality of nanoparticles and/or the second plurality of nanoparticles comprise fumed metal oxide particles and/or fumed metalloid oxide particles.

In some embodiments, an electrochemical device is described. In some embodiments, the electrochemical device comprises an anode, a cathode, and a separator between the anode and the cathode. In some embodiments, the electrochemical device comprises a first layer between the anode and the separator, with the first layer comprising a first plurality of nanoparticles. In some embodiments, the electrochemical device comprises a second layer between the cathode and the separator, with the second layer comprising a second plurality of nanoparticles. In some embodiments, the first layer and the second layer are porous. In some embodiments, the first plurality of nanoparticles and/or the second plurality of nanoparticles are metallic.

In some embodiments, an electrochemical device is described. In some embodiments, the electrochemical device comprises an anode, a cathode, and a separator between the anode and the cathode. In some embodiments, the electrochemical device comprises a first layer between the anode and the separator, with the first layer comprising a first plurality of nanoparticles. In some embodiments, the electrochemical device comprises a second layer between the cathode and the separator, with the second layer comprising a second plurality of nanoparticles. In some embodiments, the first layer and the second layer each have a porosity of greater than or equal to 60%.

In another aspect, a method is described. In some embodiments, the method comprises arranging the following components to assemble an electrochemical device: an anode, a cathode, a separator between the anode and the cathode, a first layer between the anode and the separator; and a second layer between the cathode and the separator. In some embodiments, arranging the first layer and/or the second layer comprises incorporating a material having a closest packed porosity of at least 60%.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
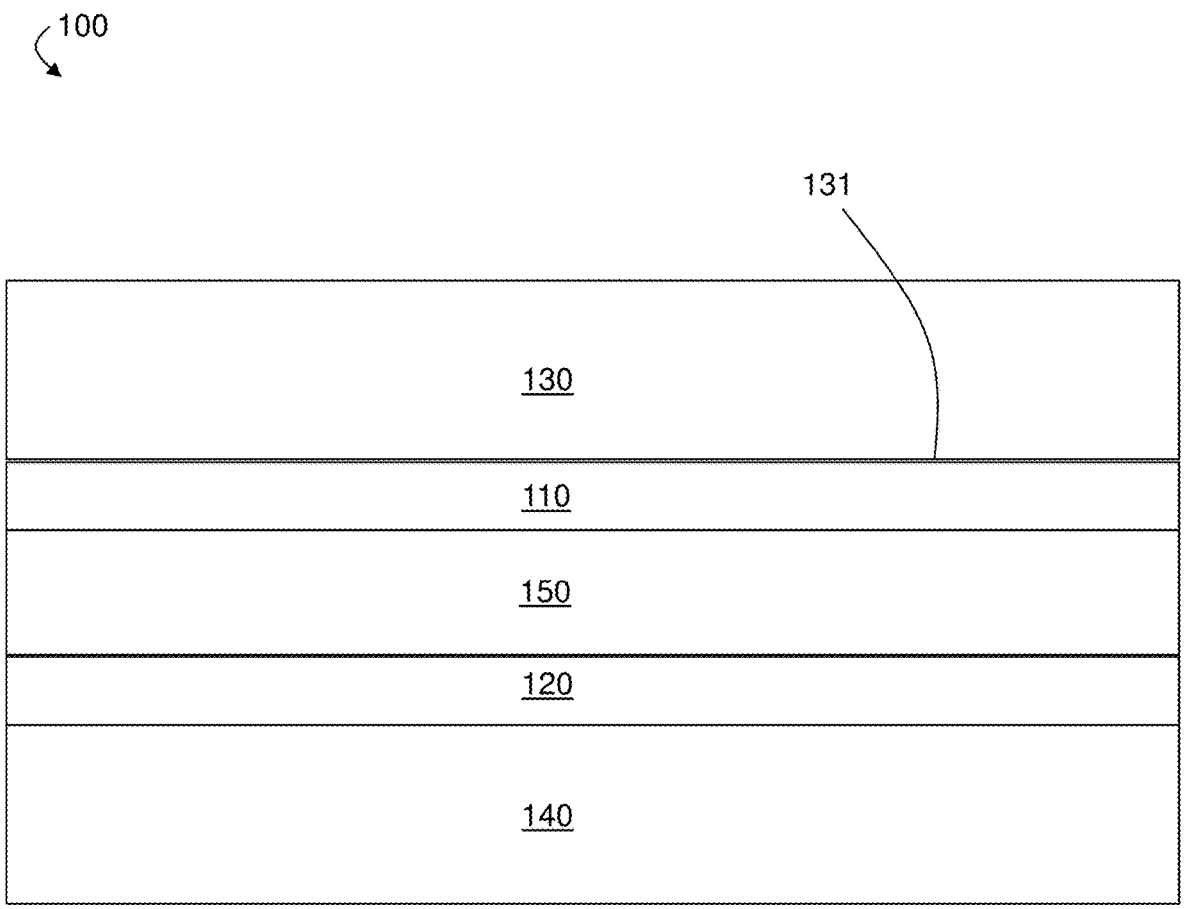
FIG. 1 is an exemplary schematic illustration depicting a cross-sectional view of an electrochemical device comprising an anode, a cathode, a first layer, and a second layer, according to certain embodiments.

Electrochemical devices that include porous layers, and associated methods, are generally described. In certain cases, the electrochemical device comprises a first layer (e.g., a porous coating) between an anode and a separator, and a second layer (e.g., another porous coating) between a cathode and the separator. The first layer and/or the second layer may have a relatively high porosity, even after the application of an applied pressure to the electrochemical device. The relatively high porosity of the first layer and/or the second layer may mitigate the occurrence of certain problematic phenomena during cycling of the electrochemical device, thereby slowing down a loss in discharge capacity during cycling of the device. For example, having a highly porous first layer between the anode and the separator and a highly porous second layer between the cathode and the separator may result in a tortuous pathway that limits dendrite propagation in some cases in which lithium and/or a lithium alloy is used as an anode active material. In some embodiments, the first layer and/or the second layer comprises nanoparticles, such as nanoparticles that have a composition and/or morphology that contribute to the relatively high porosity and pressure-resistant porosity of the first layer and/or second layer. In some cases, the nanoparticles are in the form of structures that have a branched or chain-like morphology. In certain cases, the nanoparticles are fumed metal oxide and/or fumed metalloid oxide particles (e.g., fumed silica particles), or metallic particles (e.g., aluminum metal nanoparticles). The first layer and/or the second layer may be able to be formed by incorporating material (e.g., nanoparticles) using wet-chemical techniques, thereby limiting the use of high temperatures during fabrication.

Certain electrode active materials, when used in electrochemical devices such as electrochemical cells (e.g., batteries) can be associated with deleterious phenomena that may reduce the performance of the electrochemical device (e.g., during cycling). For example, in some cases where lithium and/or a lithium alloy is used as an anode active material, lithium dendrite formation may occur, which can reduce the discharge capacity of the electrochemical device after a number of cycles. The incorporation of porous layers (e.g., coatings) on the electrodes may help mitigate such deleterious phenomena. While certain conventional electrochemical devices may incorporate a single porous coating on the anode but not the cathode (and sometimes a single porous coating on the cathode but not the anode), it has been unexpectedly observed that the presence of a first porous layer between the anode and a separator and the presence of a second porous layer between the cathode and the separator yields greater improvement in electrochemical device performance than in cases where only a single porous layer is employed, even when the total thickness of the layers are taken into account.

Moreover, the use of pressure (e.g., by applying an anisotropic force with a component normal to an anode active surface of the anode) may sometimes be employed to reduce problems associated with lithium and/or lithium alloy anodes, but that pressure tends to reduce the porosity of conventional porous layers used to limit dendrite propagation. It has been unexpectedly observed, however, that the presence of certain materials in the first layer and/or the second layer, such as nanoparticles that are in the form of branched or chain-like structures (e.g., branched or chain-like aggregates), nanoparticles that comprise fumed metal oxide particles and/or fumed metalloid oxide particles, and/or nanoparticles that comprise metallic nanoparticles, can result in the layers maintaining a relatively high porosity even after the application of a relatively high pressure. Furthermore, the layers described herein may be able to be formed in the electrochemical device using wet-chemical techniques, which may be beneficial when certain anode materials are used, such as vapor-deposited lithium (which can be sensitive to heat).

In one aspect, electrochemical devices are generally described. In some cases, the electrochemical device comprises an anode, a cathode, and a separator between the anode and the cathode. For example, FIG. 1 is a schematic illustration of exemplary electrochemical device 100 comprising anode 130, cathode 140, and separator 150 between anode 130 and cathode 140. In some cases, the electrochemical device is or comprises an electrochemical cell and is used as a battery (e.g., a rechargeable lithium or lithium ion battery).

In some cases, the electrochemical device comprises an anode. In some cases, the anode comprises an anode active material. As used herein, an "anode active material" refers to any electrochemically active species associated with an anode. In some embodiments, the anode comprises lithium and/or a lithium alloy as an anode active material. For example, referring again to FIG. 1, anode 130 comprises lithium and/or a lithium alloy as an anode active material in some embodiments. The anode can comprise, in accordance with certain embodiments, lithium metal and/or a lithium metal alloy as an electrode active material during at least a portion of or during all of a charging and/or discharging process of the electrochemical device (e.g., a battery). In certain cases, the anode is or comprises vapor-deposited lithium (e.g., a vapor-deposited lithium film). One example of vapor-deposited lithium is vacuum-deposited lithium. Certain embodiments described herein may be directed to systems and methods that may allow for improved performance (e.g., increased capacity at a greater number of cycles and/or decreased dendrite formation) of electrochemical devices comprising certain anodes, such as vapor-deposited lithium anodes. Suitable anode materials are described in more detail below.

In some embodiments, the electrochemical device comprises a cathode. In some cases, the cathode comprises a cathode active material. As used herein, a "cathode active material" refers to any electrochemically active species associated with a cathode. In certain cases, the cathode active material may be or comprise a lithium intercalation compound (e.g., a metal oxide lithium intercalation compound). As one non-limiting example, in some embodiments, cathode 140 in FIG. 1 comprises a nickel-cobalt-manganese lithium intercalation compound. Suitable cathode materials are described in more detail below.

As used herein, "cathode" refers to the electrode in which an electrode active material is oxidized during charging and reduced during discharging, and "anode" refers to the electrode in which an electrode active material is reduced during charging and oxidized during discharging.

In some embodiments, the electrochemical device comprises a separator between the anode and the cathode. As mentioned above, FIG. 1 shows exemplary separator 150 between anode 130 and cathode 140. In some cases, the separator is a porous separator. The separator may be a solid non-conductive or insulative material that separates or insulates the anode and the cathode from each other, preventing short circuiting, and that permits the transport of ions between the anode and the cathode. In some embodiments, the separator is porous and may be permeable to the electrolyte.

In some embodiments, the electrochemical device comprises a first layer between the anode and the separator. For example, referring again to FIG. 1, electrochemical device 100 comprises first layer 110 between anode 130 and separator 150. In some cases, the first layer comprises particles (e.g., nanoparticles), as described in more detail below. The presence of the first layer between the anode and the separator can, in some but not necessarily all cases, contribute to improved performance of the electrochemical device by, for example, helping to suppress certain deleterious phenomena such as dendrite formation (e.g., in some cases where lithium and/or a lithium alloy is used as an anode active material). In some cases, the first layer is directly on the anode. For example, in FIG. 1, first layer 110 is directly on anode 130. In some such cases, the first layer is formed directly on the anode via a coating process (e.g., using a wet-chemical technique). Direct contact between the first layer and the anode is not required, however, and in some embodiments, there are one or more intervening layers (e.g., solid layers such as protective layers) between the first layer and the anode. For example, in FIG. 1, intervening layers could be between anode 130 and first layer 110. The first layer may be within a relatively small distance of the anode. For example, the first layer may be within 5 mm, within 1 mm, within 500 µm, within 100 µm, within 50 µm, within 10 µm, or less of the anode.

Similarly, the first layer may be directly on the separator. For example, in FIG. 1, first layer 110 is directly on separator 150. Direct contact between the first layer and the separator is not required, however, and in some embodiments, there are one or more intervening layers (e.g., solid layers) between the first layer and the separator. For example, in FIG. 1, intervening layers could be between first layer 110 and separator 150. The first layer may be within a relatively small distance of the separator. For example, the first layer may be within 5 mm, within 1 mm, within 500 µm, within 100 µm, within 50 µm, within 10 µm, or less of the separator.

In some embodiments, the electrochemical device comprises a second layer between the cathode and the separator. For example, referring again to FIG. 1, electrochemical device 100 comprises second layer 120 between cathode 140 and separator 150. In some cases, the second layer comprises particles (e.g., nanoparticles), as described in more detail below. As with the first layer, the presence of the second layer between the cathode and the separator can, in some but not necessarily all cases, contribute to improved performance of the electrochemical device by, for example, helping to suppressing certain deleterious phenomena such as dendrite formation (e.g., in some cases where the electrochemical device comprises an anode having lithium and/or a lithium alloy as an anode active material). In some cases, the second layer is directly on the cathode. For example, in FIG. 1, second layer 120 is directly on cathode 140. In some such cases, the second layer is formed directly on the cathode via a coating process (e.g., using a wet-chemical technique). Direct contact between the second layer and the cathode is not required, however, and in some embodiments, there are one or more intervening layers (e.g., solid layers such as protective layers) between the second layer and the cathode. For example, in FIG. 1, intervening layers could be between cathode 140 and second layer 120. The second layer may be within a relatively small distance of the cathode. For example, the second layer may be within 5 mm, within 1 mm, within 500 µm, within 100 µm, within 50 µm, within 10 µm, or less of the cathode. In some cases, a portion of the second layer may interpenetrate into a portion of the cathode (e.g., interpenetrate into a portion of the cathode active material).

Similarly, the second layer may be directly on the separator. For example, in FIG. 1, second layer 120 is directly on separator 150. Direct contact between the second layer and the separator is not required, however, and in some embodiments, there are one or more intervening layers (e.g., solid layers) between the second layer and the separator. For example, in FIG. 1, intervening layers could be between second layer 120 and separator 150. The second layer may be within a relatively small distance of the separator. For example, the first layer may be within 5 mm, within 1 mm, within 500 µm, within 100 µm, within 50 µm, within 10 µm, or less of the separator.

In some embodiments, the electrochemical device comprises both a first layer between the anode and the separator, and a second layer between the cathode and the separator. Referring again to FIG. 1, for example, in some embodiments, exemplary electrochemical device 100 comprises first layer 110 between anode 130 and separator 150, and electrochemical device 100 also comprises second layer 120 between cathode 140 and separator 150. It has been observed, unexpectedly, that in some cases, the presence of both a first layer between the anode and the separator and a second layer between the cathode and the separator yields an improvement to the performance and/or durability of certain electrochemical devices (e.g., batteries) that is greater than the improvement observed when the electrochemical devices contain a layer between the anode and the separator but not between the cathode and the separator, or between the cathode and the separator but not between the anode and the separator, even when the composition, total volume, and/or thickness of the layer(s) is taken into account. For example, it has been observed that the presence of both a 1 µm-thick layer between an anode and the separator and a 1 µm-thick layer between the cathode and the separator yields a greater improvement in performance than the improvement observed with an electrochemical device having a single 2 μm-thick layer between the anode and the separator (but no such layer between the cathode and the separator) or a single 2 μm-thick layer between the cathode and the separator (but no such layer between the anode and the separator). In some cases, the presence of the first layer between the anode and the separator and the presence of the second layer between the cathode and the separator results in a tortuous pathway, which can limit deleterious phenomena (such as dendrite formation and propagation).

Figure 2:
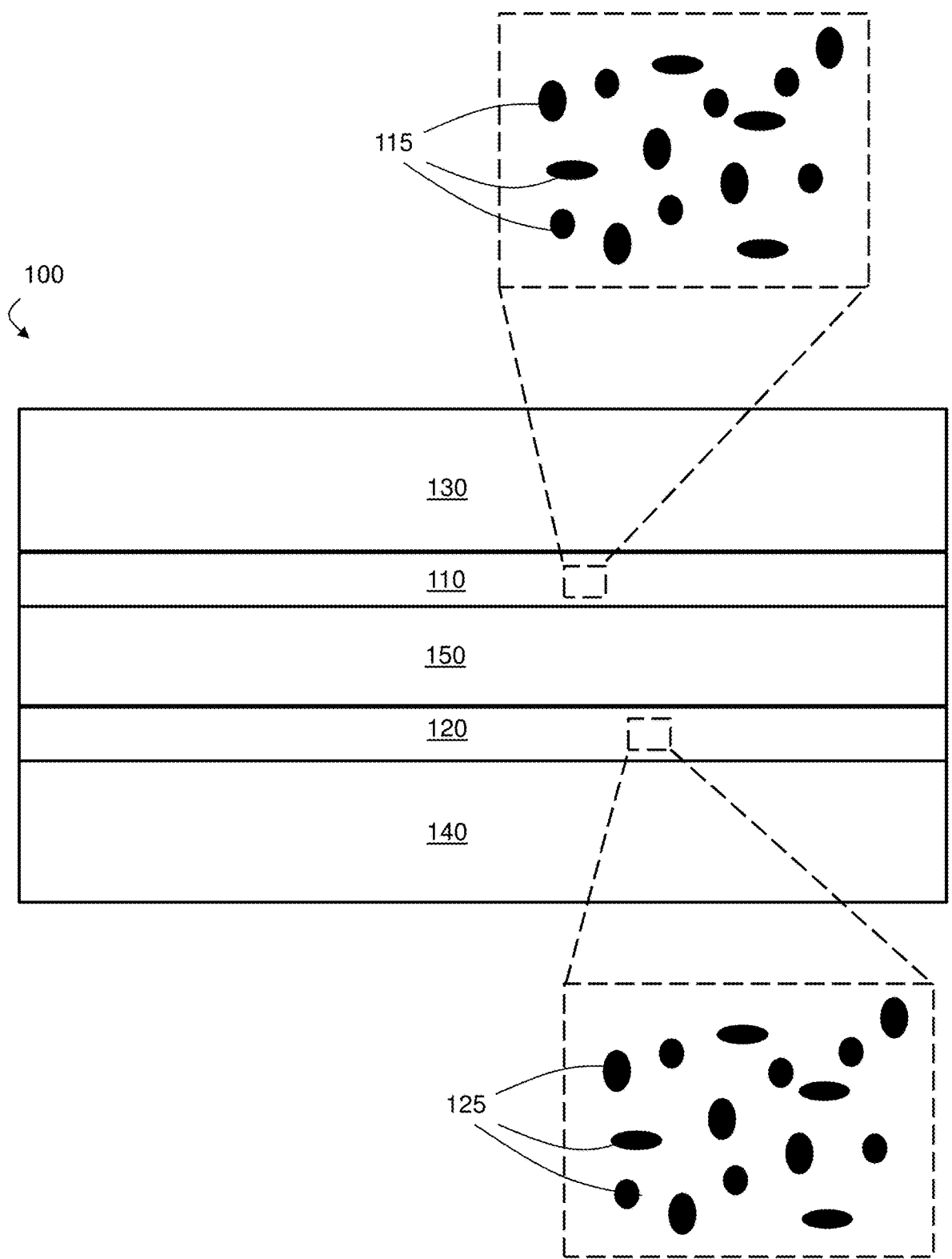
FIG. 2 is an exemplary schematic illustration depicting a cross-sectional view of an electrochemical device comprising an anode, a cathode, a first layer, and a second layer, with insets showing exemplary nanoparticles, according to certain embodiments.

In some embodiments, one or more of the layers described herein comprises nanoparticles. For example, in some embodiments, the first layer comprises a first plurality of nanoparticles. Referring to FIG. 2, in some embodiments, electrochemical device 100 comprises first layer 110, and first layer 110 comprises a first plurality of nanoparticles 115. Similarly, in some cases, the second layer comprises a second plurality of nanoparticles. Referring again to FIG. 2, in some cases, electrochemical device 100 comprises second layer 120, and second layer 120 comprises a second plurality of nanoparticles 125. In some embodiments in which the electrochemical device comprises both a first layer (e.g., between the anode and the separator) and a second layer (e.g., between the cathode and the separator), the first plurality of nanoparticles (located in the first layer) and the second plurality of nanoparticles are substantially identical in composition and/or dimensions. However, it is not necessary for the first plurality of nanoparticles and the second plurality of nanoparticles to be substantially identical either in terms of composition or in terms of the dimensions of the nanoparticles. For example, one layer of the first layer and the second layer may comprise fumed metal oxide and/or fumed metalloid oxide particles, while the other layer of the first layer and the second layer may comprise metallic nanoparticles. As one example, in some cases, the first plurality of nanoparticles (located in the first layer) comprises metallic nanoparticles (e.g., aluminum metal nanoparticles) and the second plurality of nanoparticles (located in the second layer) comprises fumed metal oxide and/or fumed metalloid oxide particles (e.g., fumed silica particles). In some embodiments, a plurality of nanoparticles in a layer of the electrochemical device may comprise more than one type of nanoparticle. For example, in some embodiments, the first plurality of nanoparticles and/or the second plurality of nanoparticles comprise a mixture of fumed metal oxide particles and/or fumed metalloid oxide particles and metallic nanoparticles. As one non-limiting example, in certain embodiments, the first plurality of nanoparticles and/or the second plurality of nanoparticles comprise a mixture of fumed silica particles and aluminum nanoparticles.

The presence of nanoparticles in the first layer and/or the second layer of the electrochemical device may contribute, at least in part, to certain beneficial properties and/or improvements of the electrochemical device. For example, the presence of the nanoparticles can contribute to a relatively high porosity of the first layer and/or the second layer, thereby helping to the avoid dendrite formation during cycling of the electrochemical device, in some cases.

In some cases, nanoparticles (e.g., the first plurality of nanoparticles and/or the second plurality of nanoparticles) are present in a relatively high weight percentage of one or more layers (e.g., the first layer and/or the second layer) in the electrochemical device. Having the nanoparticles be present in a relatively high weight percentage of a layer may contribute to the layer having certain properties that may be beneficial in certain cases (e.g., a relatively high porosity and/or relatively high pressure-resistance). In some embodiments, the first plurality of nanoparticles are present in the first layer in a weight percent (wt %) of at least 10 wt %, at least 25 wt %, at least 50 wt %, at least 75 wt %, at least 90 wt %, at least 95 wt %, at least 99 wt %, or more. In some embodiments, substantially all (e.g., 100 wt %) of the first layer is made of the first plurality of nanoparticles. Similarly, in some embodiments, the second plurality of nanoparticles are present in the second layer in a weight percent of at least 10 wt %, at least 25 wt %, at least 50 wt %, at least 75 wt %, at least 90 wt %, at least 95 wt %, at least 99 wt %, or more. In some embodiments, substantially all (e.g., 100 wt %) of the second layer is made of the second plurality of nanoparticles.

The nanoparticles may be made of a variety of materials. In some cases, the nanoparticles are made of materials or made using techniques suitable for the formation of branched or chain-like structures. In some cases, the nanoparticles comprise solid metallic materials (e.g., aluminum metal). In certain cases, the nanoparticles comprise metal oxides (e.g., fumed metal oxides) or metalloid oxides (e.g., fumed metalloid oxides). In some embodiments, the first plurality of nanoparticles and/or second plurality of nanoparticles comprise Si, Al, Ti, Bi, Zn, Cr, Fe, Ge, Ni, Mo, Sn, Zr, V, W, Cu, Mn, Ce, Sb, or a combination thereof. Certain suitable compositions and morphologies for the nanoparticles are described in more detail below.

In some cases, the nanoparticles (e.g., in the first layer and/or the second layer) have at least one cross-sectional dimension that is less than or equal to 1,000 nm. In some cases, the nanoparticles (e.g., of the first plurality of nanoparticles and/or the second plurality of nanoparticles) have a relatively small mean maximum cross-sectional dimension. Having a relatively small mean maximum cross-sectional dimension may be useful, in some cases, for forming structures (e.g., branched or chain-like structures) and/or layers having certain beneficial properties (e.g., a relatively high porosity and/or pressure-resistance). For example, in some embodiments, the first plurality of nanoparticles and/or the second plurality of nanoparticles have a mean maximum cross-sectional dimension of less than or equal to 1,000 nm, less than or equal to 150 nm, less than or equal to 100 nm, less than or equal to 60 nm, or less. In some embodiments, the first plurality of nanoparticles and/or the second plurality of nanoparticles have a mean maximum cross-sectional dimension of greater than or equal to 20 nm, greater than or equal to 40 nm, greater than or equal to 50 nm, greater than or equal to 80 nm, or more. Combinations of these ranges are possible. For example, in some cases, the first plurality of nanoparticles and/or the second plurality of nanoparticles have a maximum cross-sectional dimension of greater than or equal to 20 nm and less than or equal to 1,000 nm, or greater than or equal to 50 nm and less than or equal to 150 nm. In certain cases, such as some embodiments in which the first plurality of nanoparticles and/or the second plurality of nanoparticles comprise aluminum metal nanoparticles, the first plurality of nanoparticles and/or second plurality of nanoparticles have a mean maximum cross-sectional dimension of greater than or equal to 40 nm and less than or equal to 60 nm. The mean maximum cross-sectional dimension (also referred to as "average particle size") of a plurality of nanoparticles can be determined using a Brunauer-Emmett-Teller (BET) surface area method. For example, a BET surface measurement can be performed on the plurality of nanoparticles using a gas adsorption instrument, and the mean maximum cross-sectional dimension can be determined as the average particle diameter assuming nonporous spherical particles and using the theoretical density of the material. The equation for calculating an average particle diameter in nanometers is $6000/((\text{BET surface area in m}^2/\text{g}) \times (\text{density in g/cm}^3))$.

In some embodiments, one or more layers of the electrochemical device are porous. For example, referring again to FIG. 1, in some embodiments, first layer 110 and/or second layer 120 in electrochemical device 100 are porous. In certain cases, both the first layer and the second layer are porous. The presence of a porous first layer (e.g., between the anode and the separator) and a porous second layer (e.g., between the cathode and the separator) in the electrochemical device may, in some cases, result in a tortuous pathway between the anode and the cathode, thereby mitigating the formation of certain deleterious features during cycling of the electrochemical device, such as dendrites in some cases in which electrochemical devices comprise lithium and/or lithium alloy as an electrode active material. As an example, referring to FIG. 1, in some embodiments, first layer 110 and second layer 120 are both porous, resulting in a tortuous pathway from anode 130 to cathode 140. The tortuous pathway between anode 130 and cathode 140 may prevent or limit, for example, the propagation of a lithium dendrite from anode 130, through separator 150, and to cathode 140. In certain cases, the tortuous pathway limits the propagation of lithium dendrites from the anode by reducing the flux of lithium ions toward the anode (e.g., during a charging process of the electrochemical cell).

As used herein, a "pore" refers to a pore as measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g., closed cells) are not considered pores within the context of the invention. It should be understood that, in cases where the article comprises an agglomeration of particles, pores include both the interparticle pores (i.e., those pores defined between particles when they are packed together, e.g., interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

The porosity of a component of the electrochemical device (e.g., the first layer, the second layer) may be measured by physically separating the different regions of the electrochemical device by, for example, cutting out a region of the component, and then measuring the separated portion using the above-referenced ASTM Standard Test D4284-07.

In some embodiments, one or more layers has a relatively high porosity. For example, in some cases, the first layer and/or the second layer has a porosity of greater than or equal to 40%, greater than or equal to 60%, greater than or equal to 80%, or higher by volume. In some embodiments, the first layer and the second layer each have a porosity of greater than or equal to 40%, greater than or equal to 60%, greater than or equal to 80%, or higher by volume. In some embodiments, the first layer and/or the second layer has a porosity of less than or equal to 90%, less than or equal to 80%, or less by volume. In certain cases, the first layer and the second layer each have a porosity of less than or equal to 90%, less than or equal to 80%, or less by volume. Combinations of these ranges are possible. For example, in some cases, the first layer and the second layer each have a porosity of greater than or equal to 40% and less than or equal to 90%.

In some embodiments, one or more layers has an average pore size suitable for improving the performance of the electrochemical device (e.g., by limiting dendrite formation). For example, in some cases, the first layer and/or the second layer has an average pore size of greater than or equal to 10 nm, greater than or equal to 50 nm, greater than or equal to 100 nm, greater than or equal to 500 nm, or greater. In some embodiments, the first layer and the second layer each have an average pore sizes greater than or equal to 10 nm, greater than or equal to 50 nm, greater than or equal to 100 nm, greater than or equal to 500 nm, or greater. In certain cases, the first layer and/or the second layer have an average pore size of less than or equal to 5 µm, less than or equal to 2 µm, less than or equal to 1,000 nm, or less. In some embodiments, the first layer and the second layer each have an average pore size of less than or equal to 5 µm, less than or equal to 2 µm, less than or equal to 1000 nm, or less. Combinations of these ranges are possible. For example, in some embodiments, the first layer and the second layer each have an average pore size of greater than or equal to 10 nm and less than or equal to 5 µm.

In some embodiments, one or more layers (e.g., the first layer and/or the second layer) of the electrochemical device can maintain a relatively high porosity even after experiencing a relatively high applied pressure. In other words, in some cases, one or more of the layers of the electrochemical device are pressure-resistant with respect to the porosity of the layers. The pressure experienced by the electrochemical device or a component thereof (e.g., experienced by the first layer and/or second layer) may be a result of an applied anisotropic force having a component normal to an anode active surface of an anode of the electrochemical device, as described in more detail below. Having the first layer and/or the second layer be able to maintain a relatively high porosity even under a relatively high pressure (e.g., due to an anisotropic force applied to electrochemical device (e.g., during assembly of the electrochemical device and/or during a charging or discharging event of the electrochemical device)) may be useful in some cases in which both the application of pressure and the presence of a tortuous pathway are used to limit certain deleterious phenomena such as dendrite formation and/or an increase in surface area of the anode during cycling. It is been observed that when the first layer and the second layer comprise certain conventional materials (e.g., conventional nanoparticles), the porosity of the first layer and/or the second layer may be decreased when the first layer and/or the second layer experience pressure. In some such cases, this reduction of the porosity of the first layer and/or the second layer when the first and/or second layer comprises conventional materials creates a less tortuous pathway (e.g., for lithium dendrite propagation), thereby mitigating the beneficial effects of the presence of the first layer and/or the second layer. Certain embodiments described herein, however, are directed to electrochemical devices comprising a first layer and/or a second layer that can maintain a relatively high porosity even after experiencing an applied pressure (e.g., a pressured defined by the application of an anisotropic force with a component normal to an anode active surface). In some cases, the first layer and/or second layer are pressure-resistant with respect to porosity due to the presence of certain types of nanoparticle materials and/or morphologies. Referring to FIG. 1, in some embodiments, first layer 110 and/or second layer 120 may have a relatively high porosity (e.g., at least 40%, at least 60%, etc.) even after electrochemical device 100 experiences a relatively high anisotropic pressure (e.g., at least 12 kg/cm$^2$) in a direction normal to active surface 131 of anode 130.

In some embodiments, the first layer and/or the second layer has a porosity of at least 40%, at least 60%, at least 80%, or more by volume after experiencing an applied pressure of at least 12 kg/cm$^2$ for a period of 14 hours. In some embodiments, the first layer and/or the second layer has a porosity of up to 90%, up to 80%, or less by volume after experiencing an applied pressure of at least 12 kg/cm$^2$ for a period 14 hours. In some embodiments, the first layer and/or the second layer experiences a change in porosity of less than or equal to 20%, less than or equal to 10%, and/or as little as 5%, as little as 2% or less upon the application of a pressure of at least 12 kg/cm$^2$ for a period of 14 hours compared to the porosity before the application of the pressure. The percentage changes described herein are calculated relative to the smaller of the two porosities. For example, if the porosity of the first layer and/or second layer is decreased from 88% to 80% after experiencing an applied pressure, then the porosity of the first layer and/or second layer has decreased by 10%.

One way the porosity of a layer of an electrochemical device can be measured after the electrochemical device experiences an applied pressure is to apply the pressure (e.g., by applying a pressure of at least 12 kg/cm$^2$ for a period of 14 hours), and then after applying the pressure, measure the porosity of the layer according to the porosity measurement technique described above.

One way the change in porosity of a layer of an electrochemical device can be measured after the electrochemical device experiences an applied pressure is to prepare two essentially identical electrochemical devices, and measure the porosity of the layer of one of the electrochemical devices without applying any pressure (according to the porosity measurement technique described above), and then applying pressure to the other electrochemical device (e.g., applying a pressure of at least 12 kg/cm$^2$ for a period of 14 hours). After applying the pressure, the porosity of the layer of the electrochemical device that experienced the applied pressure can be measured according to the porosity measurement technique described above. The porosity measurements of the two electrochemical devices can then be compared to determine a percentage change in porosity.

Figure 3A:
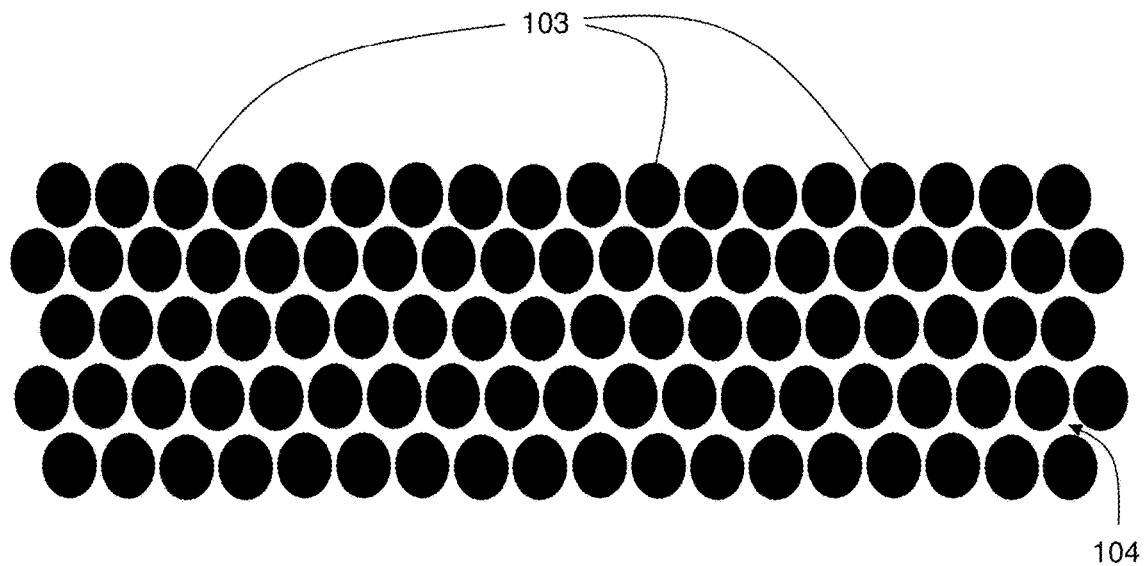
FIG. 3A is an exemplary schematic illustration showing a plurality of nanoparticles that are not in the form of branched or chain-like structures, according to certain embodiments.
Figure 3B:
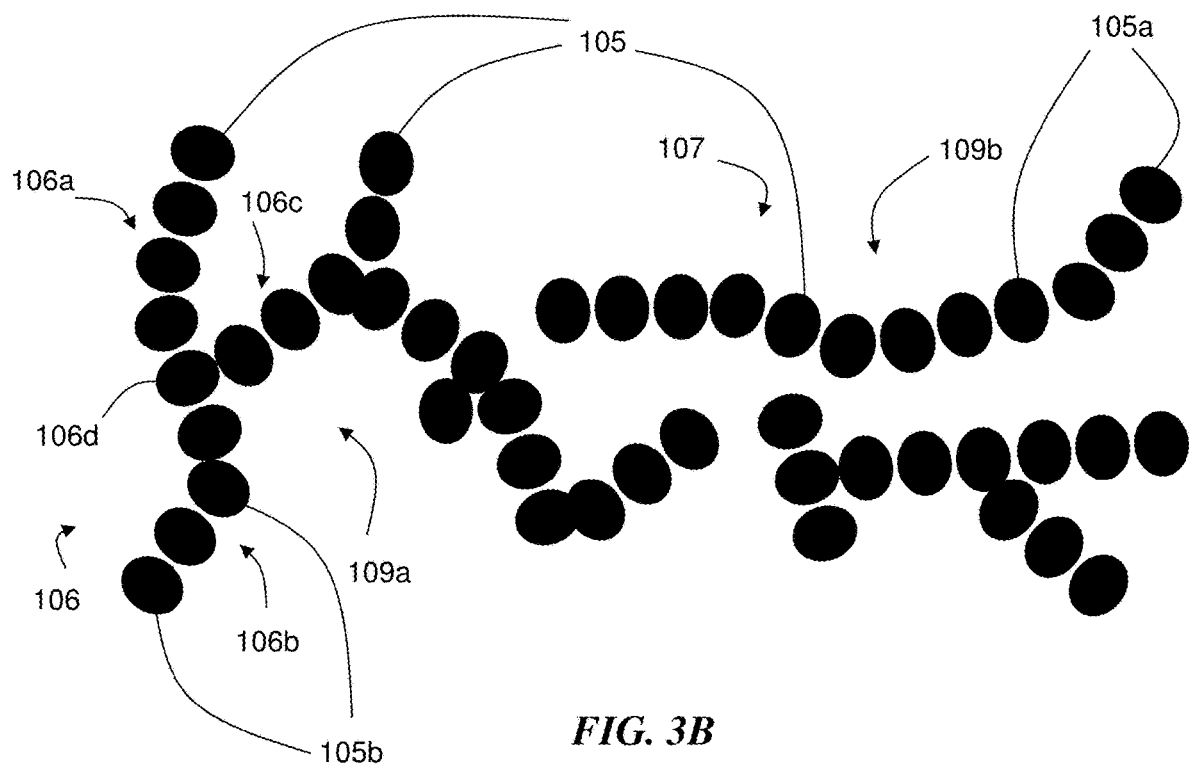
FIG. 3B is an exemplary schematic illustration showing a plurality of nanoparticles that are in the form of branched or chain-like structures, according to certain embodiments.
Figure 4:
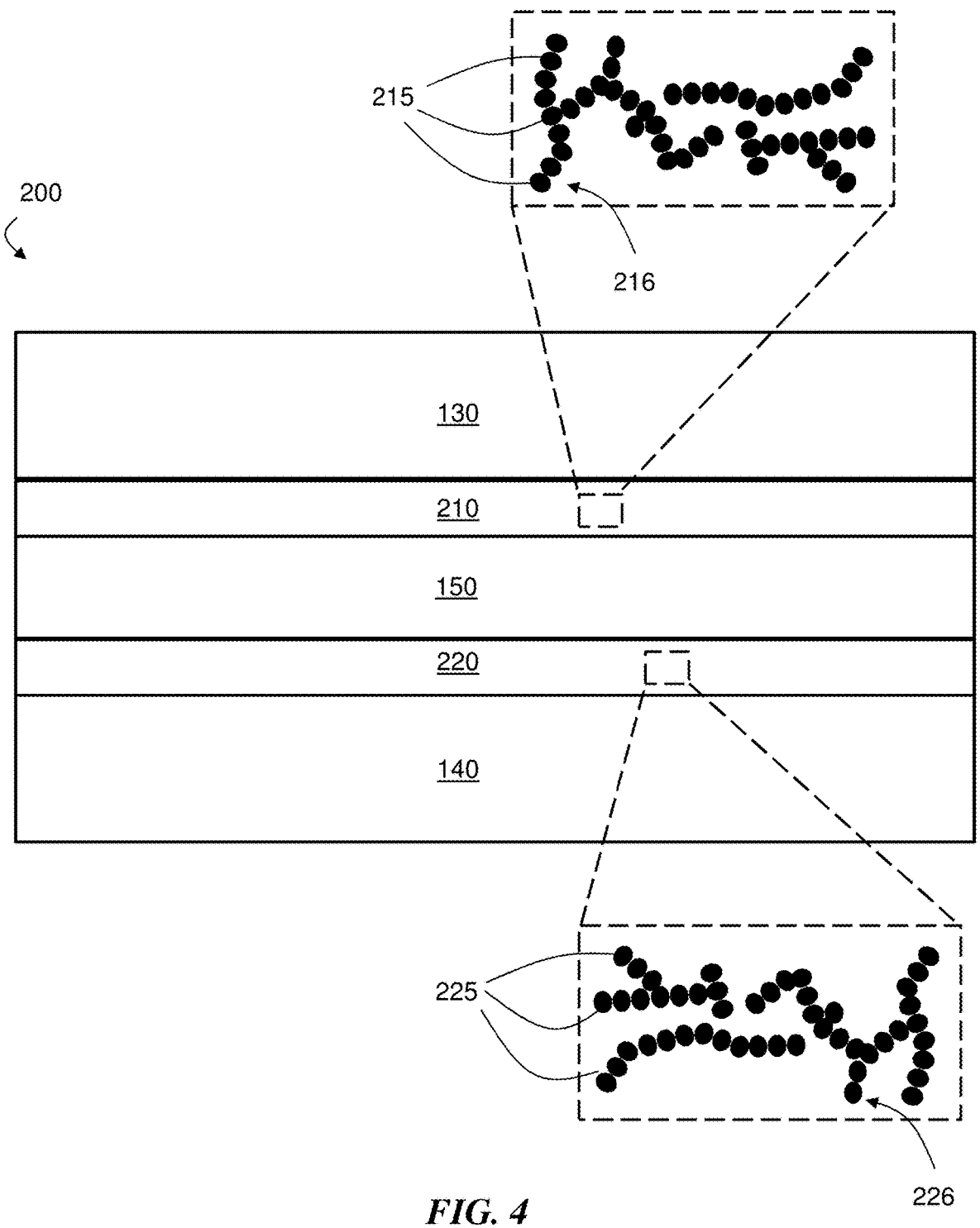
FIG. 4 is an exemplary schematic illustration depicting a cross-sectional view of an electrochemical device comprising an anode, a cathode, a first layer, and a second layer, with insets showing exemplary nanoparticles, according to certain embodiments.

In some embodiments, the nanoparticles (or a subset of the nanoparticles) of one or more of the layers of the electrochemical device are in the form of branched or chain-like structures. It has been observed that the presence of branched or chain-like structures in a layer (e.g., the first layer and/or the second layer) may contribute to a relatively high porosity of the layer as well as to an ability of the layer to maintain a relatively high porosity even after experiencing an applied pressure. For example, in some cases, the nanoparticles of the first plurality of nanoparticles are in the form of at least one branched or chain-like structure. FIG. 3B is a schematic diagram showing a plurality of nanoparticles 105, at least some of which are in the form of branched structure 106 and at least some of which are in the form of chain-like structure 107. In certain cases, the nanoparticles of the second plurality of nanoparticles are in the form of at least one branched or chain-like structure. Referring to FIG. 4, in some embodiments, electrochemical device 200 comprises first layer 210 comprising a first plurality of nanoparticles 215, and at least some of the nanoparticles of the first plurality of nanoparticles 215 are in the form of branched structure 216. Similarly, in some embodiments, electrochemical device 200 comprises second layer 220 comprising a second plurality of nanoparticles 225, and at least some of the nanoparticles of the second plurality of nanoparticles 225 are in the form of branched structure 226. In certain embodiments, at least some of the nanoparticles of the first plurality of nanoparticles are in the form of a branched or chain-like structure, and at least some of the nanoparticles of the second plurality of nanoparticles are in the form of a branched or chain-like structure.

A branched or chain-like structure is formed by nanoparticles due to non-covalent interactions between the nanoparticles, in accordance with certain embodiments. A chain-like structure is an aggregate of non-covalently linked particles (e.g., primary particles such as nanoparticles) that has a relatively high aspect ratio. FIG. 3B depicts exemplary chain-like structure 107 formed from nanoparticles 105a of the plurality of nanoparticles 105. A branched structure comprises aggregates of non-covalently linked particles (e.g., primary particles such as nanoparticles) that are in the form of multiple branches (e.g., chains of particles that meet at nodes (e.g., branch points)). In some cases, at least three, at least four, or more branches meet at a node in a branched structure. For example, referring again to FIG. 3B, branched structure 106 is an aggregate of primary nanoparticles 105b of the plurality of nanoparticles 105, in accordance with certain embodiments. Branched structure 106 comprises branch 106a, branch 106b, and branch 106c, each of which meet at node 106d. Collections of branched or chain-like structures contain volumes (e.g., voids) that do not contain the primary particles (e.g., nanoparticles), and those volumes are larger than the voids (e.g., interstices) found in closest packing arrangements of the primary particles. For example, referring again to FIG. 3B, the collection of the plurality of nanoparticles 105 comprises branched structure 106 and chain-like structure 107, and the collection also contains volume 109a and volume 109b, which do not contain any primary nanoparticles 105a or primary nanoparticles 105b, with volume 109a and volume 109b each being larger than void 104 found in the closest packing arrangement of the plurality of nanoparticles 103 shown in FIG. 3A. Exemplary non-covalent interactions between nanoparticles in a branched or chain-like structure include van der Waals forces, hydrogen bonding, and the like. One non-limiting example of a material comprising branched or chain-like structures is fumed silica, described in more detail below.

In contrast, nanoparticles that are not in the form of branched or chain-like structures may be packed in a closest packing arrangement or be capable of packing in a closest packing arrangement in a layer. For example, FIG. 3A is a diagram showing a plurality of nanoparticles 103, and no nanoparticle 103 is a part of a branched or chain-like structure. Instead, the plurality of nanoparticles 103 have a closest packing configuration. The depiction of a closest packing configuration in FIG. 3A is to show an example of a configuration in which there are no branched or chain-like structures; it should be understood that there are configurations of nanoparticles other than a closest packing configuration that do not contain branched or chain-like structures.

The presence of particles in the form of branched or chain-like structures in one or more layers (e.g., the first layer and/or the second layer) of the electrochemical device may contribute to a number of beneficial effects. For example, the volumes within the collection of branched or chain-like structures described above (e.g., relatively large voids) may contribute to a relatively high porosity of a layer comprising the branched or chain-like structures. Unexpectedly, in some cases the branched or chain-like structures may contribute to a layer comprising the branched or chain-like structures being able to maintain a relatively high porosity even after the layer has experienced a relatively high applied pressure. For example, the morphology of the branched or chain-like structures may result in three-dimensional networks of agglomerates of particles with interlocking branches and/or chains, and the mechanical strength of the interlocking branches and/or chains may be sufficient to prevent particles from being mechanically forced to fill in the voids, even when a relatively high pressure is applied to the layer. By maintaining the voids even under an applied pressure, the porosity of the layer may be relatively high or change relatively little upon the application of the pressure. In contrast, a plurality of nanoparticles that are not in the form of branched or chain-like structures may adopt a closest-packing arrangement upon the application of pressure, which may result in a relatively large loss in porosity and/or a low resulting porosity, which may, in some cases, result in the loss of certain beneficial properties of the layer (e.g., the loss of tortuous pathway to limit lithium (Li) dendrite formation).

As mentioned above, in some embodiments, the branched or chain-like structures (e.g., of the first and/or second plurality of nanoparticles) may comprise aggregates of nanoparticles. In some cases, the branched or chain-like structures comprise agglomerates of nanoparticles. For example, two or more branched or chain-like structures comprising aggregates of nanoparticles may be associated with each other (e.g., via non-covalent interactions), resulting in an agglomerate (e.g., a tertiary structure) of the two or more branched or chain-like structures. In some such cases, the aggregate of the two or more branched or chain-like structures is in the form of a branched or chain-like structure that is larger than the two or more branched or chain-like structures that it comprises. The presence of aggregates of branched or chain-like structures (e.g., comprising the first plurality of nanoparticles and/or the second plurality of nanoparticles) may contribute at least in part to an ability for the first layer and/or second layer to have a high porosity even after experiencing a relatively high applied pressure.

In some embodiments, the branched or chain-like structures (e.g., in the first layer and/or the second layer) have a relatively long average length. For example, in some embodiments, the branched or chain-like structures have an average length of at least 200 nm, at least 500 nm, at least 1 µm, at least 5 µm, or more. In some embodiments, the branched or chain-like structures have an average length of less than or equal to 20 µm, less than or equal to 10 µm, less than or equal to 4 µm, less than or equal to 2 µm, or less. Combinations of these ranges are possible. For example, in some embodiments, the branched or chain-like structures have an average length of greater than or equal to 200 nm and less than or equal to 20 µm. The length of the branched or chain-like structures may be measured, for example, using scanning electron microscopy (SEM).

In some embodiments, the branched or chain-like structures have a relatively high aspect ratio. For example, in some cases, the branched or chain-like structures have a length and a smallest cross-sectional dimension, and the aspect ratio is the ratio of the length to the smallest cross-sectional dimension. In some embodiments, the branched or chain-like structures have an aspect ratio of at least 2, at least 5, at least 10, at least 50, at least 100, or more. In some embodiments, the branched or chain-like structures have an aspect ratio of less than or equal to 1000, less than or equal to 500, or less. Combinations of these ranges are possible.

For example, in some embodiments, the branched or chain-like structures have an aspect ratio of at least 2 and less than or equal to 1000.

In some embodiments, one or more layers of the electrochemical device comprises a plurality of nanoparticles that comprises fumed metal oxide particles and/or fumed metalloid oxide particles. For example, in some cases, the first layer of the electrochemical device comprises a first plurality of nanoparticles, and the first plurality of nanoparticles comprises fumed metal oxide particles and/or fumed metalloid oxide particles. Similarly, in some cases, the second layer of the electrochemical device comprises a second plurality of nanoparticles, and the second plurality of nanoparticles comprises fumed metal oxide particles and/or fumed metalloid oxide particles. Referring again to FIG. 2, in some embodiments, first layer 110 comprises a first plurality of nanoparticles 115 comprising fumed metal oxide particles and/or fumed metalloid oxide particles, and second layer 120 comprises a second plurality of nanoparticles 125 comprising fumed metal oxide particles and/or fumed metalloid oxide particles. One of ordinary skill in the art would be familiar with exemplary fumed particles such as a fumed metal oxide particles or fumed metalloid oxide particle, and would be able to identify such particles (e.g., in an electrochemical cell). It has been observed, unexpectedly, that layers comprising fumed metal oxide particles and/or fumed metalloid oxide particles can have a relatively high porosity, and in some cases, the layers comprising fumed metal oxide particles and/or fumed metalloid oxide particles can maintain a relatively high porosity even after experiencing a relatively high applied pressure. In some embodiments, a layer comprising fumed metal oxide particles and/or fumed metalloid oxide particles has a higher porosity or maintains a higher porosity upon experiencing an applied pressure than does an otherwise identical layer comprising metal oxide particles and/or metalloid oxide particles of the same composition but that are not fumed. In some embodiments, the fumed metal oxide particles and/or fumed metalloid oxide particles form at least one branched or chain-like structure. In certain embodiments, at least one branched or chain-like structure in the first layer and/or second layer comprises fumed metal oxide particles and/or fumed metalloid oxide particles.

The fumed metal oxide particles may comprise any suitable metal oxide. For example, the fumed metal oxide particles may comprise a transition metal oxide. Exemplary transition metal oxides suitable for use as fumed metal oxide particles include, but are not limited to, metal oxides comprising Ti, Zn, Cr, Fe, Ni, Mo, Zr, V, W, Cu, Mn, or combinations thereof. In some cases, the fumed metal oxide particles comprise a metal that is not a transition metal. Exemplary metal oxides suitable for use as fumed metal oxide particles that include metals that are not transition metals include, but are not limited to, metal oxides comprising Al, Sn, Ce, or combinations thereof.

The fumed metalloid oxide particles may comprise any suitable metalloid oxide. For example, the fumed metalloid oxide particles may comprise a metalloid oxide comprising Si, Ge, Sb, or combinations thereof. In some embodiments, the fumed metalloid oxide particles (e.g., in the first plurality of nanoparticles and/or the second plurality of nanoparticles) comprise Si. In some embodiments, the first plurality of nanoparticles and/or second plurality of nanoparticles comprise silica ($SiO_2$). For example, in some embodiments where the first plurality of nanoparticles and/or the second plurality of nanoparticles comprises fumed metal oxide particles and/or fumed metalloid oxide particles, the fumed metalloid oxide particles comprise fumed silica (e.g., fumed $SiO_2$).

A person of ordinary skill would understand how to make or acquire fumed metal oxide particles and/or fumed metalloid oxide particles. For example, fumed silica can be prepared via the flame pyrolysis of silicon tetrachloride, or via vaporizing quartz sand (e.g., with an electric arc). Suitable fumed metal oxides and/or metalloid oxides may also be commercially available. For example, fumed silica can be purchased from Evonik under the name Aerosil® (e.g., Aerosil® R 812 S), or from Cabot Corporation under the name CAB-O-SIL® (e.g., CAB-O-SIL® TS-720).

In some embodiments, at least a portion of the surface of the fumed metal oxide particles and/or fumed metalloid oxide particles comprises an organosilane, an organosiloxane, or a combination thereof. The presence of the organosilane, the organosiloxane, or a combination thereof on at least a portion of the surface of the fumed metal oxide particles and/or fumed metalloid oxide particles may, in some cases, contribute to a relatively high hydrophobicity of the fumed metal oxide particles and/or fumed metalloid oxide particles. Having a relatively high hydrophobicity may improve the performance of the one or more layers comprising the fumed metal oxide particles and/or fumed metalloid oxide particles (e.g., by limiting the exposure of an electrode such as the anode to moisture, which may cause deleterious phenomena in some cases). Exemplary organosilane compounds that can be present on at least a portion of the fumed metal oxide particles and/or fumed metalloid oxide particles include, but are not limited to alkylsilanes (e.g., silanes comprising methyl, ethyl, propyl, butyl, pentyl, hexyl, or longer alkyl chains, or optionally-substituted variations thereof such as fluoroalkyl groups). In some cases, the organosilane is covalently bonded to the surface of the fumed metal oxide particles and/or fumed metalloid oxide particles. Exemplary organosiloxane compounds that can be present on at least a portion of the fumed metal oxide particles and/or fumed metalloid oxide particles include, but are not limited to alkylsiloxanes (e.g., silanes comprising methyl, ethyl, propyl, butyl, pentyl, hexyl, or longer alkyl chains, or optionally-substituted variations thereof, such as fluoroalkylgroups). In some embodiments, the organosiloxane is or comprises an oligomer or polymer. For example, in some embodiments in which at least a portion of the surface of the fumed metal oxide particles and/or fumed metalloid oxide particles comprises an organosiloxane, the organosiloxane comprises a poly(dialkylsiloxane), such as poly(dimethylsiloxane) (PDMS).

In some embodiments, one or more layers of the electrochemical device comprise nanoparticles that are metallic. For example, in some cases, the first layer comprises a first plurality of nanoparticles, and the first plurality of nanoparticles are metallic particles. Similarly, in some embodiments, the second layer comprises a second plurality of nanoparticles, and the second plurality of nanoparticles are metallic particles. Referring again to FIG. 2, for example, in some cases, the first plurality of nanoparticles 115 are metallic, and the second plurality of nanoparticles 125 are also metallic. In certain cases, the first layer and the second layer are porous layers (e.g., have a relatively high porosity), and the first plurality of nanoparticles and/or the second plurality of nanoparticles are metallic. In some cases, a porous layer comprising metallic nanoparticles (e.g., the first layer comprising the first plurality of nanoparticles) may have a relatively high specific surface area. In some embodiments, a layer comprising metallic nanoparticles may have a relatively low ratio of bulk density to skeletal density. For example, the ratio of the bulk density to skeletal density may be less than or equal to 0.6, less than or equal to 0.4, less than or equal to 0.2, less than or equal to 0.1, and/or as low as 0.05, as low as 0.02, or as low as 0.01. Having a relatively low ratio of bulk density to skeletal density may contribute to the layer having a relatively high porosity. In certain cases, the ratio of bulk density to skeletal density of a layer can be determined by dividing the weight of a layer (e.g., determined after mechanically removing it from the electrochemical cell) by the geometric volume of the layer (e.g., determined using SEM). In some embodiments, metallic nanoparticles form at least one branched or chain-like structure. In certain embodiments, at least one branched or chain-like structure in the first and/or second layer comprises metallic nanoparticles.

Exemplary metals that the nanoparticles may comprise include, but are not limited to, Ti, V, Cr, Mn, Fe, Co, Ni, Cu, Zn, Al, or combinations thereof. In some embodiments, the first plurality of nanoparticles and/or the second plurality of nanoparticles comprise aluminum metal. The presence of aluminum metal may, in certain cases, cause certain beneficial chemical reactions to occur. For example, in some cases where HF is present in the electrochemical device (e.g., in certain cases where HF had been used during fabrication of the electrochemical device), aluminum metal of the nanoparticles may react with the HF (thereby reducing the amount of HF in the electrochemical device) without releasing $H_2O$ (the presence of which may be problematic in some cases, such as when the anode comprises lithium or lithium alloy as an anode active material).

In some cases, the metallic nanoparticles (e.g., aluminum metal nanoparticles) may be purchased commercially. In some cases, the metallic nanoparticles can be prepared using an electrical explosion technique (e.g., an electrical wire explosion technique), which may provide for powders of metallic nanoparticles with certain properties that may be beneficial, such as a relatively high specific surface area.

Certain embodiments are directed to cycling the electrochemical device. Cycling the electrochemical device (e.g., electrochemical cell such as a battery) may comprise a charging event (e.g., charging with an external power source or charger by applying a voltage to electrochemical cells of the electrochemical device) and a discharging event (e.g., an electrochemical reaction between anode active material and cathode active material that generates electricity). In some embodiments, cycling the electrochemical device may cause a loss in discharge capacity of the electrochemical device due to, for example, side reactions between electrode active material (e.g., lithium anode active material) and/or dendrite formation (e.g., formation of lithium dendrites that propagate from the anode). It has been observed that the presence of the first layer and second layer described herein can mitigate a loss in discharge capacity during cycling of the electrochemical device. For example, in some cases, the presence of the first layer (e.g., between the anode and the separator) and the second layer (e.g., between the cathode and the separator) increases the number of cycles required to reach a discharge capacity that is 80% or less of the initial discharge capacity of the electrochemical device (the discharge capacity prior to the first cycle). In some, but not necessarily all embodiments, the presence of the first layer and the second layer causes an increase in the number of cycles required to reach a discharge capacity that is 80% or less of the initial capacity, and that increase is at least 10% and/or up to 15% or more, relative to an otherwise identical electrochemical device that does not comprise the first layer and the second layer.

Certain embodiments are directed to methods of fabricating electrochemical devices. More specifically, certain embodiments are directed to methods of arranging components to assemble an electrochemical device. In some embodiments, the method comprises arranging the following components to assemble the electrochemical device: an anode, a cathode, and a separator between the anode and the cathode. In some embodiments, the method comprises arranging a first layer between the anode and the separator. Similarly, in some embodiments, the method comprises arranging a second layer between the cathode and the separator. For example, in some embodiments, the method comprises arranging first layer 110 between anode 130 and separator 150. Similarly, in some embodiments, the method comprises arranging second layer 120 between cathode 140 and separator 150. Arranging the first layer and/or the second layer may comprise forming the first layer on the anode and/or forming the second layer on the cathode (e.g., and then arranging the combined anode and first layer, the combined cathode and second layer, and the separator to form the electrochemical device).

In some embodiments, arranging the first layer and/or the second layer comprises incorporating material having a relatively high closest packed porosity. For example, in some embodiments, arranging the first layer and/or the second layer comprises incorporating fumed metal oxide particles, fumed metalloid oxide particles, and/or metal nanoparticles having a relatively high closest packed porosity. The closest packed porosity of a material refers to the porosity of a domain of that material when the components of that material are in their closest packing configuration. For example, if the material incorporated into the first layer and/or the second layer is a powder of aluminum nanoparticles, the closest packed porosity of the powder of aluminum nanoparticles refers to the porosity of a domain formed by those aluminum nanoparticles when they are in their closest packing configuration. It should be understood that when the material is incorporated into the first layer and/or the second layer, the material may not necessarily be in its closest packing configuration. In some embodiments, arranging the first layer and/or the second layer comprises incorporating material having a closest packed porosity of greater than or equal to 60%, greater than or equal to 80%, and/or up to 90%, up to 95%, or more by volume.

In some embodiments, arranging the first layer and/or the second layer comprises depositing the material (e.g., the material having a relatively high closest packed porosity) using a wet-chemical technique. Exemplary wet-chemical techniques, include, but are not limited to, depositing a fluid dispersion (e.g., a slurry) containing the material such that the first layer and/or the second layer are formed when the fluid is evaporated, drop-casting a liquid containing the material onto an underlying substrate (e.g., anode, cathode), and spin-coating the anode and/or cathode with a liquid containing the material. In certain cases, using wet-chemical techniques to deposit the material (e.g., onto the anode and/or the cathode) may be beneficial by allowing for the formation of the first layer and/or the second layer without using techniques that require the application of heat. For example, in some cases where the anode comprises vapor-deposited lithium, the use of techniques that involve heat to form the first layer may damage the vapor-deposited lithium. Therefore, the use of wet chemical techniques to deposit the material can reduce the risk of damaging the vapor-deposited lithium during fabrication of the electrochemical cell. In some embodiments in which an evaporation step is used during the arranging of the first layer (e.g., after depositing a fluid dispersion containing the material onto the anode and/or cathode), the evaporation may occur at an ambient temperature (e.g., a temperature between 20-25° C.). However, in some cases in which an evaporation step is used during the arranging of the first layer (e.g., after depositing a fluid dispersion containing the material onto the anode and/or cathode), the evaporation may occur at an elevated temperature (e.g., a temperature greater than 25° C., greater than or equal to 50° C., greater than or equal to 100° C., and/or up to 130° C. or higher). In some embodiments, the evaporation step is performed under vacuum conditions, such as in a vacuum oven.

In some embodiments, the material is incorporated (e.g., into the first layer and/or the second layer) via a wet-chemical technique involving the use of a non-aqueous liquid. For example, in some embodiments, the wet chemical technique used to incorporate the material comprises drop-casting the material from a non-aqueous liquid. In certain embodiments, the wet-chemical technique comprises incorporating the material as a dispersion (e.g., a fluid dispersion is used to incorporate material by applying a fluid dispersion to the surface of the anode and/or the cathode). In some cases, the fluid dispersion comprises a non-aqueous liquid. In some cases, the dispersion comprises poly(acrylic acid). As one example, in some cases in which the material incorporated into the layer includes metallic nanoparticles (e.g., aluminum metal nanoparticles), the material is incorporated via a dispersion comprising poly(acrylic acid).

One non-limiting way to drop-cast or otherwise apply a non-aqueous solution or dispersion comprising the material (e.g., fumed metal oxide particles, fumed metalloid oxide particles, metal nanoparticles), is to sonicate the solution or dispersion and then use a pipette to apply the solution or dispersion to the surface of the anode and/or cathode.

In some embodiments, the non-aqueous liquid comprises more than one non-aqueous liquid component (e.g., solvents and/or co-solvents). The non-aqueous liquid may comprise at least 1, at least 2, at least 3, at least 4, or more non-aqueous liquid components. For example, in some embodiments, the non-aqueous liquid is a binary mixture of two non-aqueous liquid components. In some embodiments, the non-aqueous liquid comprises a mixture of a polar solvent and a non-polar solvent. As a specific example, in some embodiments, arranging the second layer comprises incorporating the material by depositing the material onto the cathode using a non-aqueous liquid comprising a relatively polar non-aqueous liquid (e.g., dimethyl acetamide (DMAc)) and comprising a relatively non-polar non-aqueous liquid (e.g., propylene glycol monomethyl ether acetate (PMA)). In some embodiments, the ratio of the non-polar non-aqueous liquid to the polar non-aqueous liquid is 2:1 by weight. Another exemplary suitable non-polar non-aqueous liquid is butyl acetate. Another exemplary polar non-aqueous liquid is N,N-dimethylformamide (DMF). The use of non-aqueous liquids comprising a non-polar non-aqueous liquid and a polar non-aqueous liquid, may, in some but not necessarily all cases, result in the formation of a layer (e.g., the second layer) with improved properties relative to layers formed using only a non-polar non-aqueous liquid or only a polar non-aqueous liquid. For example, it has been observed that in some cases, depositing material using only a non-polar non-aqueous liquid may result in a layer that is flaky and delaminates easily. Moreover, it is been observed that depositing material using only a polar non-aqueous liquid may result in the polar non-aqueous liquid dissolving portions of the electrode upon which the layers are being formed (e.g., the cathode, such as a cathode comprising a lithium metal oxide intercalation compound). However, the use of non-aqueous liquids comprising a non-polar non-aqueous liquid and a polar non-aqueous liquid may result in a layer for which flake-formation, delamination, and electrode dissolution occur at negligible or suitably low levels.

As mentioned above, in some embodiments, the material incorporated into the first layer and/or the second layer comprises a metal powder. In some such cases, the metal powder comprises metallic nanoparticles. The metallic nanoparticles may be any of the metallic nanoparticles described above, such as aluminum nanoparticles. In certain cases, the metal powder is prepared using an electrical explosion technique. One of ordinary skill would understand how to perform an electrical explosion technique to prepare a metal powder. For example, in some cases, an exploding wire method is used to prepare the metal powder, where a rising electrical current (e.g., supplied by a capacitor) is applied to a thin (e.g., less than 5 mm in diameter) metal wire, causing the wire to explode due to rapid ohmic heating. In some embodiments, preparing the metal powder using an electrical explosion technique results in the metal powder that, when incorporated into the first layer and/or the second layer, contributes to the first layer and/or second layer having a relatively high porosity and/or a porosity that is relatively pressure-resistant.

In some embodiments, one or more of the layers of the electrochemical device comprise at least one additive. The presence of an additive may, in some cases, lead to certain beneficial properties of the electrochemical device. In some embodiments, the first layer and/or the second layer further comprises an additive. In some, but not necessarily all cases, the additive is a polymeric binder. The presence of a polymeric binder may lead to improved mechanical properties of the first layer and/or second layer. Exemplary polymeric binders include, but are not limited to, poly (dimethylsiloxane), poly(acrylic acid), lithium polyacrylate, or combinations thereof. As a specific example, in some cases, the first layer and/or the second layer comprises poly(acrylic acid). In some embodiments, the additive is an electrolyte. Suitable electrolytes are described in more detail below. The electrolyte additive may be or comprise a salt. For example, the electrolyte additive may be or comprise a lithium salt. Exemplary lithium salts include, but are not limited to, lithium nitrate ($LiNO_3$), lithium carbonate ($Li_2CO_3$), lithium nitride ($Li_3N$), lithium bis(oxalate)borate, lithium hexafluorophosphate ($LiPF_6$), lithium fluorosulfonylimide (LiFSi), or combinations thereof. Salts containing cations other than lithium, such as potassium salts (e.g., potassium nitrate ($KNO_3$)) may also be used. In some embodiments, the additive is a compound that improves the thermal conductivity of the first layer and/or the second layer. For example, in some cases, the additive is or comprises a nitride, such as boron nitride, aluminum nitride, or a combination thereof. In certain cases, the additive is or comprises a compound that improves the electrical conductivity of the first layer and/or the second layer. For example, in some cases, the additive is or comprises an electrically conductive carbon-based material such as, but not limited, to, a carbon nanotube (e.g., a multiwalled carbon nanotube).

While in some embodiments the first layer and/or the second layer comprises a polymeric material (e.g., as a binder), in some embodiments, polymeric material is present in a relatively low weight percentage of the first layer and/or the second layer, by weight of the first layer and/or second layer. Having a relatively low weight percentage of the first layer and/or second layer be polymeric material (e.g., binder) may be beneficial in certain cases where it is desirable to have the first layer and/or second layer have a relatively high porosity, but where it is also undesirable to have polymeric material present (e.g., to contribute to the relatively high porosity), because the use of a polymeric material may require the use of heat during fabrication. The use of heat may, in certain cases, such as in some cases in which lithium and/or a lithium alloy such as vapor-deposited lithium are used as an anode active material, be detrimental to the performance of the resulting electrochemical device.

In some embodiments, the amount of polymeric material in the first layer is less than or equal to 20 wt %, less than or equal to 10 wt %, less than or equal to 5 wt %, less than or equal to 1 wt %, or less by weight of the first layer. In some embodiments, the amount of polymeric material in the second layer is less than or equal to 20 wt %, less than or equal to 10 wt %, less than or equal to 5 wt %, less than or equal to 1 wt %, or less by weight of the second layer.

In some embodiments, the first layer and/or the second layer has a relatively small thickness. Having a relatively small thickness can, in some cases, contribute to a relatively high energy density for the electrochemical device, which may be useful in some instances in which the electrochemical device is used as a battery. In some embodiments, the thickness of the first layer is less than or equal to 20 μm, less than or equal to 10 μm, less than or equal to 5 μm, less than or equal to 2 μm, less than or equal to 1 μm, less than or equal to 500 nm or less. In some embodiments, the thickness of the first layer is greater than or equal 100 nm, greater than or equal to 200 nm, or greater. Combinations of these ranges are possible. For example, in some embodiments, the thickness of the first layer is greater than or equal to 100 nm and less than or equal to 20 μm. Similarly, in some embodiments, the thickness of the second layer is less than or equal to 20 μm, less than or equal to 10 μm, less than or equal to 5 μm, less than or equal to 2 μm, less than or equal to 1 μm, less than or equal to 500 nm or less. In some embodiments, the thickness of the second layer is greater than or equal 100 nm, greater than or equal to 200 nm, or greater. Combinations of these ranges are possible. For example, in some embodiments, the thickness of the second layer is greater than or equal to 100 nm and less than or equal to 20 μm.

In some, but not necessarily all embodiments, the components of the first layer and/or the second layer have a relatively low lithium ion conductivity. For example, in some embodiments, the first plurality of nanoparticles and/or the second plurality of nanoparticles have a relatively low lithium ion conductivity. It has been observed that good cycling performance of the electrochemical cell can be achieved even in cases where the first layer and/or the second layer comprise components (e.g., nanoparticles) made of materials having relatively low lithium ion conductivity. In some embodiments, the first plurality of nanoparticles and/or the second plurality of nanoparticles are not lithium-ion-conductive. In some embodiments, the first plurality of nanoparticles and/or the second plurality of nanoparticles have a lithium ion conductivity of less than or equal to $10^{-8}$ S/cm, less than or equal to $10^{-9}$ S/cm, and/or as low as $10^{-10}$ S/cm, or lower at room temperature. Combinations of these ranges are possible. For example, in some embodiments, the first plurality of nanoparticles and/or the second plurality of nanoparticles has a lithium ion conductivity that is less than or equal to $10^{-8}$ S/cm and as low as $10^{-10}$ S/cm. It should be understood that while in some cases the first plurality of nanoparticles and/or the second plurality of nanoparticles have a relatively low lithium ion conductivity, the first layer and/or the second layer may still have a relatively high lithium ion conductivity. For example, in some cases, the first layer and/or second layer is porous and comprises liquid electrolyte present in at least some of the pores of the layer, and the liquid electrolyte may have a relatively high lithium ion conductivity.

One method for determining lithium ion conductivity is electrochemical impedance spectroscopy. For example, a layer of a plurality of nanoparticles may be placed between two electrodes, and resistance may be measured over a range of frequencies from 100,000 Hz to 0.01 Hz at an amplitude of 5 mV. The lithium ion conductivity of the layer of nanoparticles may then be calculated from the measured resistance values.

A variety of anode active materials are suitable for use with the anodes of the electrochemical device (e.g., comprising an electrochemical cell) described herein, according to certain embodiments. In some embodiments, the anode active material comprises lithium (e.g., lithium metal), such as lithium foil, lithium deposited onto a conductive substrate or onto a non-conductive substrate (e.g., a release layer), and/or lithium alloys (e.g., lithium-aluminum alloys and/or lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium (e.g., lithium metal and/or a lithium metal alloy) during at least a portion of or during all of a charging and/or discharging process of the electrochemical device.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

According to some embodiments, an electrode (e.g., lithium anode) of the article and/or electrochemical cell may comprise one or more coatings or layers (that are different than the first layer and second layer described above) formed from polymers, ceramics, and/or glasses. The coating may serve as a protective layer and may serve different functions. Those functions may include preventing the formation of dendrites during recharging which could otherwise cause short circuiting, preventing reaction of the electrode active material with electrolyte, and improving cycle life. Examples of such protective layers include those described in: U.S. Pat. No. 8,338,034 to Affinito et al. and U.S. Patent Publication No. 2015/0236322 to Laramie at al., each of which is incorporated herein by reference in its entirety for all purposes. Additional details regarding certain protective layers that may be used are described in more detail below.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: $MgO$, $Al_2O_3$, $SiO_2$, $TiO_2$, $ZnO_2$, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

In some embodiments, the electrochemical device comprises an electrolyte. The electrolytes used in electrochemical devices (e.g., electrochemical cells or battery cells) can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, the electrolyte comprises a fluid that can be added at any point in the fabrication process. In some cases, the electrochemical cell may be fabricated by providing a cathode and an anode, applying an anisotropic force component normal to the active surface of the anode, and subsequently adding the fluid electrolyte such that the electrolyte is in electrochemical communication with the cathode and the anode. In other cases, the fluid electrolyte may be added to the electrochemical cell prior to or simultaneously with the application of the anisotropic force component, after which the electrolyte is in electrochemical communication with the cathode and the anode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI). Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al., which is incorporated herein by reference in its entirety for all purposes.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate (CF$_3$SO$_3^-$), bis (fluorosulfonyl)imide (N(FSO$_2$)$_2^-$, bis (trifluoromethyl sulfonyl)imide ((CF$_3$SO$_2$)$_2$N$^-$, bis (perfluoroethylsulfonyl) imide((CF$_3$CF$_2$SO$_2$)$_2$N$^-$ and tris(trifluoromethylsulfonyl) methide ((CF$_3$SO$_2$)$_3$C$^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

As mentioned above, the electrochemical device may comprise a separator. In some cases, the separator is porous. In some such cases, the pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes (e.g., following the formation of the first layer or second layer), for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes (e.g., following the formation of the first layer or second layer), as described in U.S. Pat. Nos. 6,153,337 and 6,306,545 by Carlson et al. Solid electrolytes and gel electrolytes may also function as a separator in addition to their electrolyte function.

In some embodiments described herein, a force, or forces, is applied to one or more portions of an electrochemical cell (e.g., an electrochemical cell that is part of an electrochemical device comprising the article described herein). Such application of force may reduce irregularity or roughening of an electrode surface of the cell (e.g., when lithium metal or lithium alloy anodes are employed), thereby improving performance. Electrochemical cells in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

The force may comprise, in some instances, an anisotropic force with a component normal to an active surface of the anode of the electrochemical cell. In the embodiments described herein, electrochemical cells (e.g., rechargeable batteries) may undergo a charge/discharge cycle involving deposition of metal (e.g., lithium metal or other active material) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with certain embodiments described herein, to reduce such behavior and to improve the cycling lifetime and/or performance of the cell.

Figure 5:
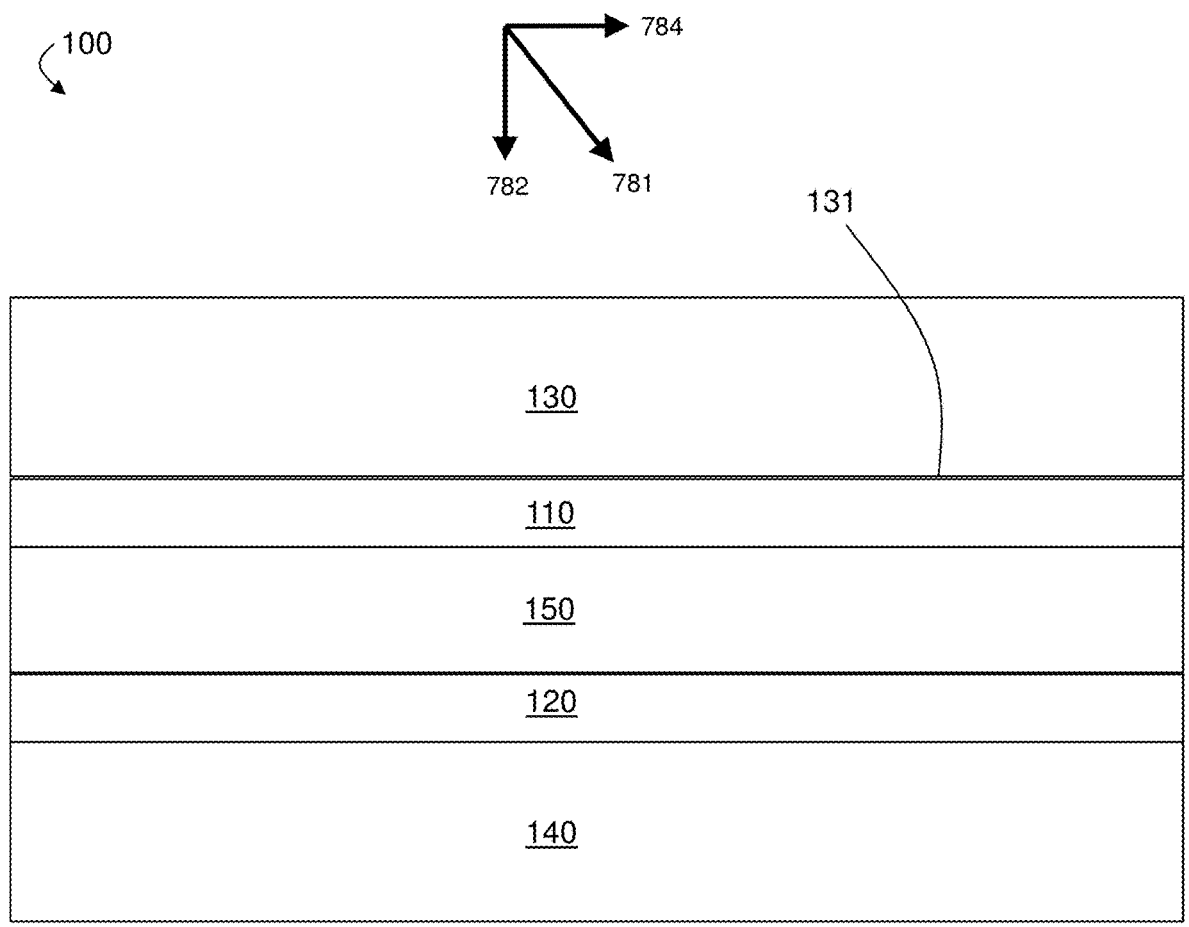
FIG. 5 is an exemplary schematic illustration depicting a cross-sectional view of an electrochemical device comprising an anode, a cathode, a first layer, and a second layer, according to certain embodiments.

Referring to FIG. 5, a force may be applied in the direction of arrow 781. Arrow 782 illustrates the component of force 781 that is normal to active surface 131 of anode 130. In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to an active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction substantially parallel to the first axis than the force applied substantially parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces.

In one set of embodiments, devices described herein are configured to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrochemical cell. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

In some embodiments, an anisotropic force with a component normal to an active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least 4.9, at least 9.8, at least 24.5, at least 49, at least 78, at least 98, at least 117.6, at least 147, at least 175, at least 200, at least 225, or at least 250 Newtons per square centimeter. In some embodiments, the component of the anisotropic force normal to the anode active surface may, for example, define a pressure of less than 250, less than 225, less than 196, less than 147, less than 117.6, less than 98, less than 49, less than 24.5, or less than 9.8 Newtons per square centimeter. In some cases, the component of the anisotropic force normal to the anode active surface may define a pressure of between 4.9 and 147 Newtons per square centimeter, between 49 and 117.6 Newtons per square centimeter, between 68.6 and 98 Newtons per square centimeter, between 78 and 108 Newtons per square centimeter, between 4.9 and 250 Newtons per square centimeter, between 49 and 250 Newtons per square centimeter, between 80 and 250 Newtons per square centimeter, between 90 and 250 Newtons per square centimeter, or between 100 and 250 Newtons per square centimeter. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One of ordinary skill in the art will be familiar with kilogram-force-based units, and will understand that 1 kilogram-force is equivalent to 9.8 Newtons.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least 8 $kg_f/cm^2$, at least 9 $kg_f/cm^2$, at least 10 $kg_f/cm^2$, at least 20 $kg_f/cm^2$, at least 30 $kg_f/cm^2$, at least 40 $kg_f/cm^2$, or at least 50 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least 8 $kg_f/cm^2$, at least 9 $kg_f/cm^2$, at least 10 $kg_f/cm^2$, at least 20 kg/cm², at least 30 kg/cm², at least 40 kg/cm², or at least 50 kg/cm² of externally-applied pressure, the lithium surface may become smoother with cycling when the pressing surface is smooth. As described herein, the pressing surface may be modified by choosing the appropriate material(s) positioned between the anode and the cathode.

In some cases, one or more forces applied to the cell have a component that is not normal to an active surface of an anode. For example, in FIG. 5, force component 784 is not normal to active surface 131 of anode 130. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least 5%, at least 10%, at least 20%, at least 35%, at least 50%, at least 75%, at least 90%, at least 95%, at least 99%, or at least 99.9% larger than any sum of components in a direction that is parallel to the anode active surface.

The anisotropic force described herein may be applied using any suitable method. In some embodiments, the force may be applied using compression springs. For example, the electrochemical device may be situated in an optional enclosed containment structure with one or more compression springs situated between a current collector and the adjacent wall of containment structure to produce a force with a component in the direction normal to the active surface of the electrode. In some embodiments, the force may be applied by situating one or more compression springs outside the containment structure such that the spring is located between an outside surface of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, electrochemical devices may be pre-compressed before they are inserted into containment structures, and, upon being inserted to the containment structure, they may expand to produce a net force on the electrochemical device. Such an arrangement may be advantageous, for example, if the electrochemical device is capable of withstanding relatively high variations in pressure. In such embodiments, the containment structures may have a relatively high strength (e.g., at least 100 MPa, at least 200 MPa, at least 500 MPa, or at least 1 GPa). In addition, the containment structure may have a relatively high elastic modulus (e.g., at least 10 GPa, at least 25 GPa, at least 50 GPa, or at least 100 GPa). The containment structure may comprise, for example, aluminum, titanium, or any other suitable material.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser.

No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216, 559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

U.S. Provisional Application No. 62/851,164, filed May 22, 2019, and entitled "Electrochemical Devices Including Porous Layers" is incorporated herein by reference in its entirety for all purposes.

The following examples are intended to illustrate certain embodiments of the present invention, but do not exemplify the full scope of the invention.

Example 1

Figure 6:
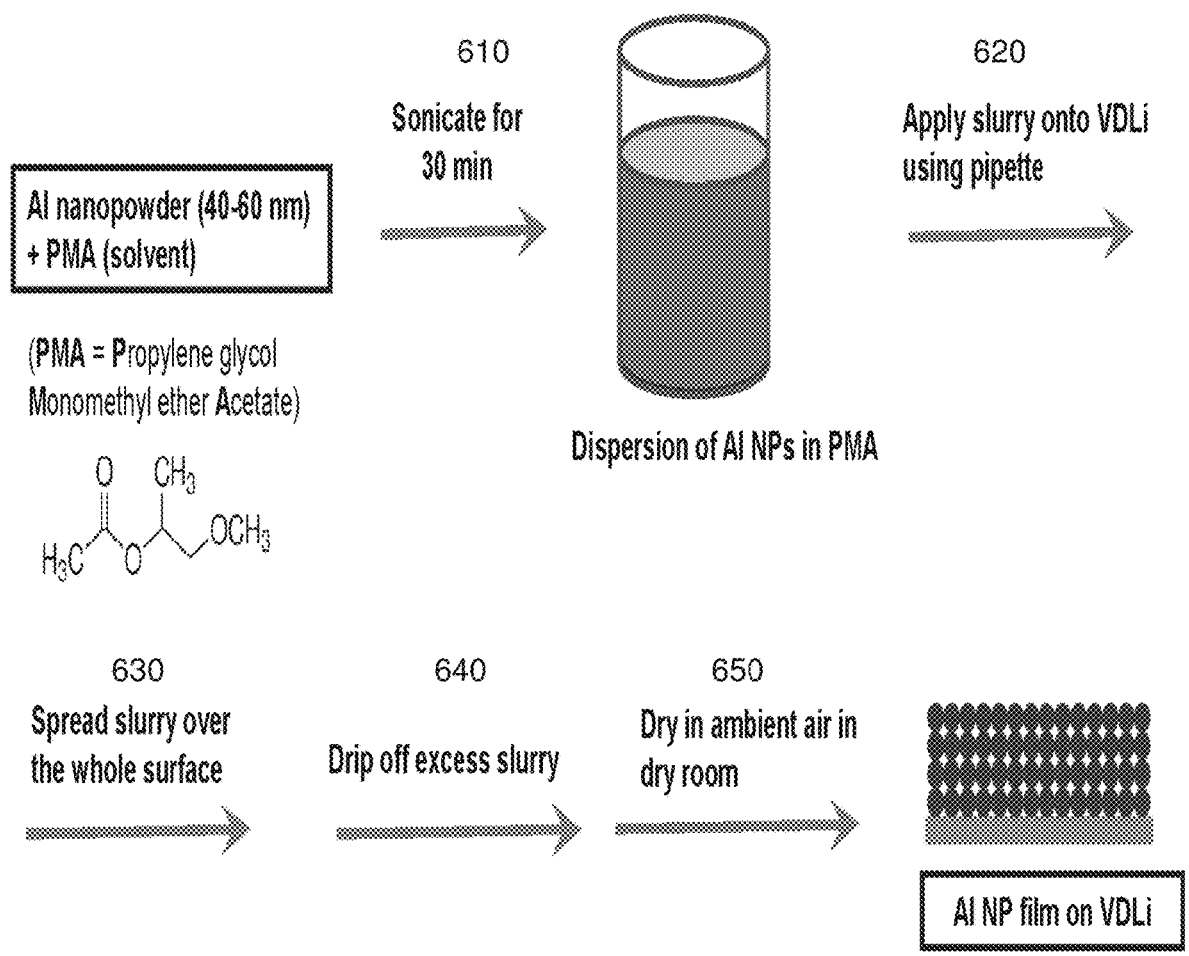
FIG. 6 is an exemplary flow diagram describing a non-limiting procedure for forming a layer comprising aluminum nanoparticles on lithium, according to certain embodiments.

In this example, the formation and characterization of a layer of aluminum nanoparticles on lithium in accordance with certain embodiments is described. FIG. 6 is a flow diagram showing steps of the procedure used to form the layer of aluminum nanoparticles. In step 610 shown in FIG. 6, aluminum nanopowder formed via an electrical wire explosion technique with average particle sizes between 40-60 nm (as determined using a BET surface area method) were dispersed into a propylene glycol monomethyl ether acetate (PMA) solvent and sonicated for 30 minutes to form a dispersion. In step 620 shown in FIG. 6, the dispersion was applied as a slurry to vacuum-deposited lithium by pipetting the dispersion on to the lithium. In step 630 shown in FIG. 6, the slurry was mechanically spread over the entire surface of the vacuum-deposited lithium, and excess liquid from the slurry was allowed to drip off, as described in step 640. In step 650 shown in FIG. 6, the sample containing the resulting vacuum-deposited lithium sample comprising the layer of spread slurry of aluminum nanopowder was allowed to dry at ambient temperature and pressure (approximately 20° C. and 1 atmosphere) in a dry room for 4 hours, resulting in the formation of the layer of aluminum nanoparticles on the lithium. An alternative method for drying the layer is to place the sample in a vacuum oven set to 130° C. under a reduced pressure for 1 hour.

Figure 7A:
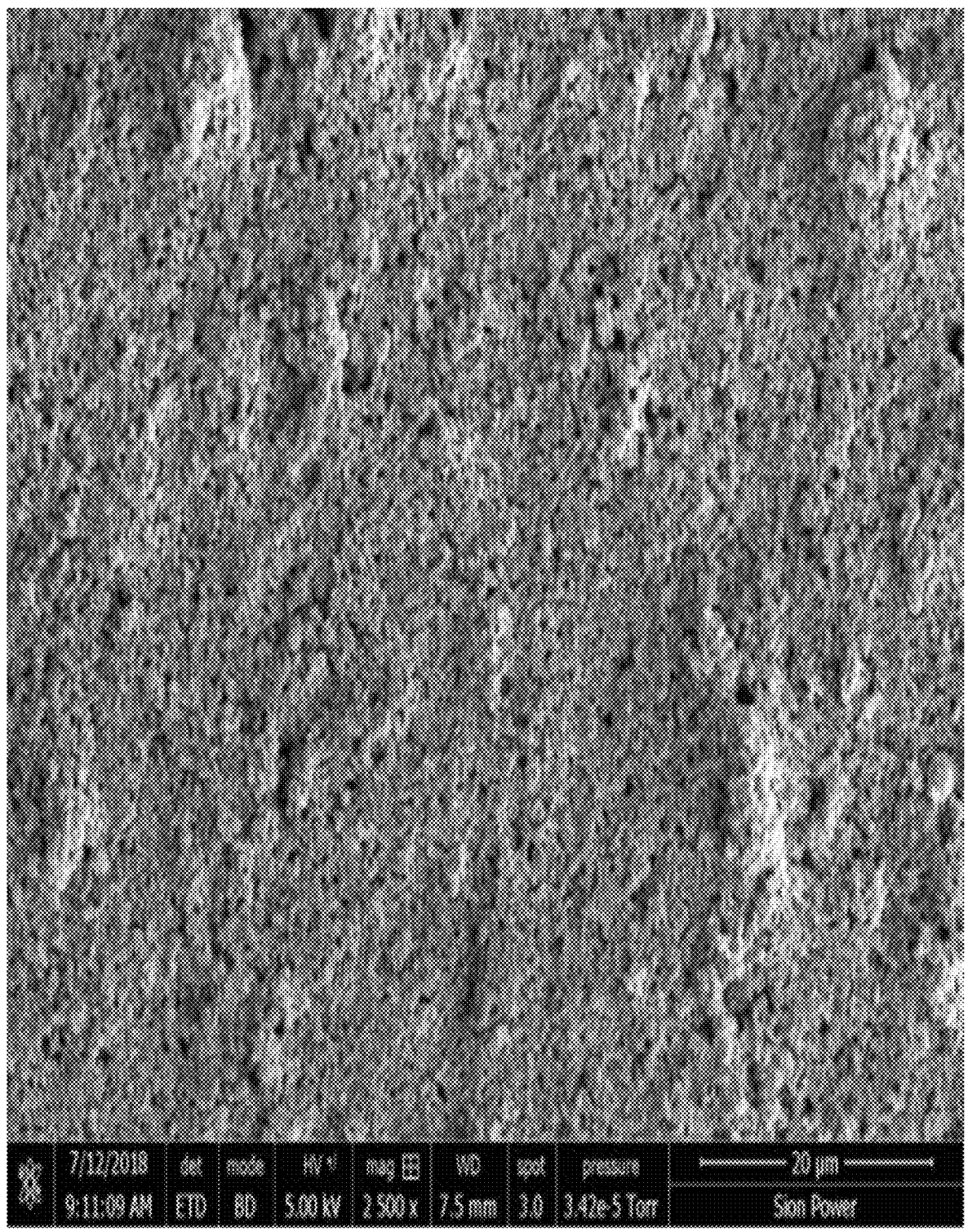
FIGS. 7A-7B are plane-view scanning electron microscopy (SEM) images of a layer comprising aluminum nanoparticles, according to certain embodiments.
Figure 7B:
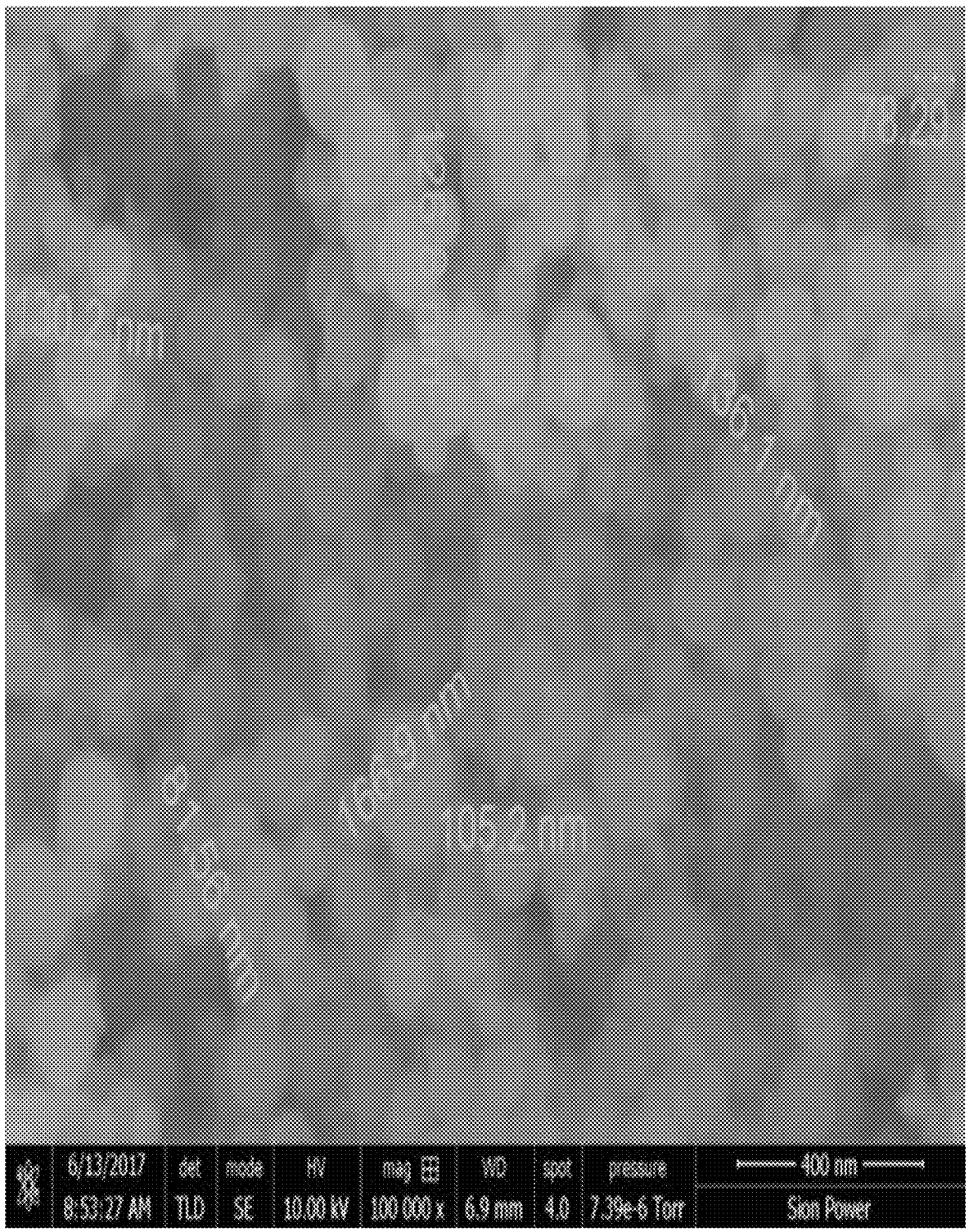
Figure 7C:
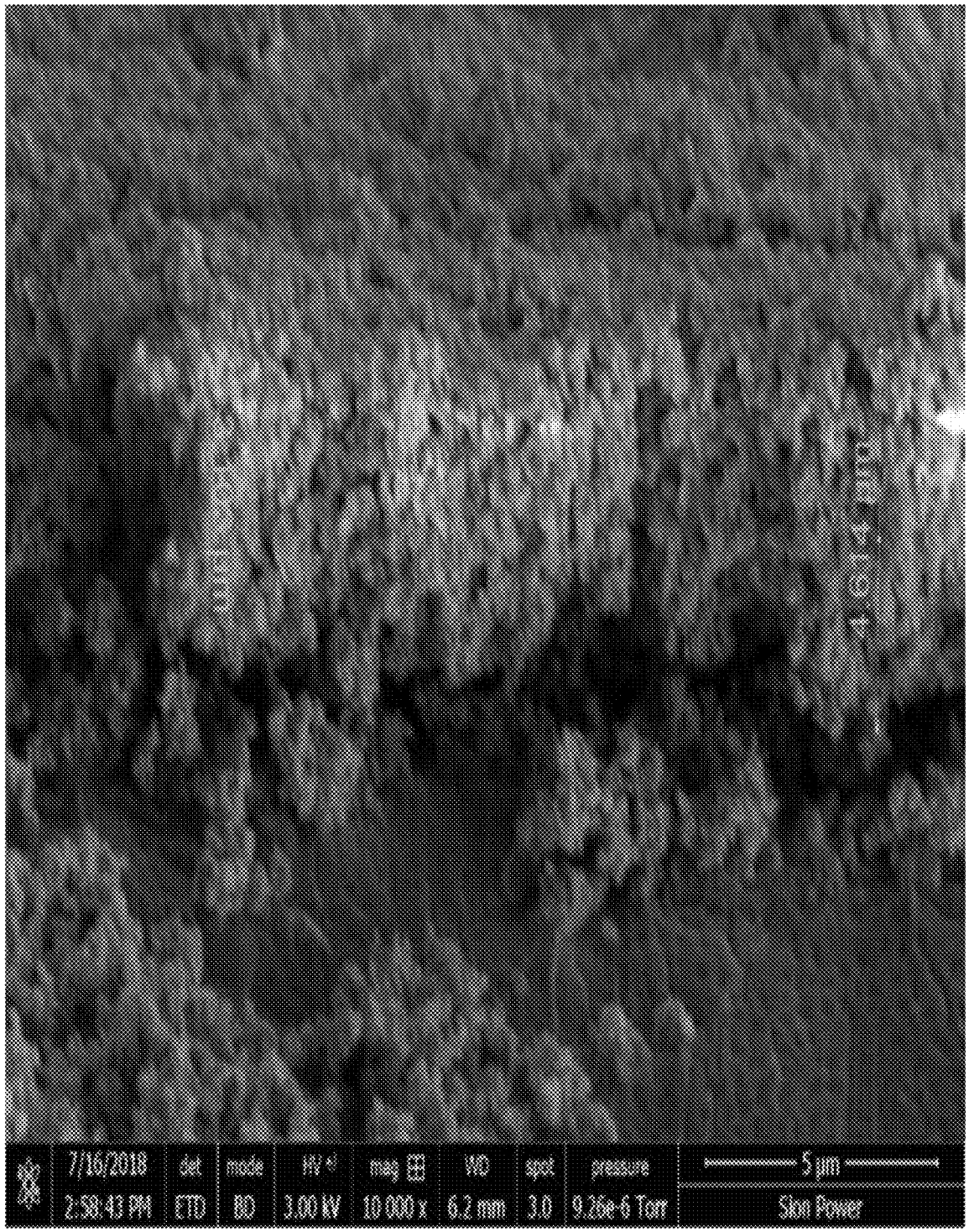
FIG. 7C is an SEM image of cross-section of a layer comprising aluminum nanoparticles on a lithium layer, according to certain embodiments.

FIGS. 7A-7C show scanning electron microscopy (SEM) images of an aluminum nanoparticle layer formed according to the method described in this example. FIG. 7A shows a low-magnification plane-view image of the layer, and the porous morphology of the layer is apparent. FIG. 7B shows a high-magnification plane-view image of the layer, and the particle sizes (as determined by SEM rather than a BET method) of several of the aluminum nanoparticles are indicated. As shown in FIG. 7B, at least some of the aluminum nanoparticles are fused together at joining points and are in the form of branched or chain-like particles. FIG. 7C shows a cross-sectional image of the layer, and a thickness of approximately 5 µm is indicated.

Example 2

This example compares the charge-discharge cycling performance of an electrochemical cell that has both a layer containing branched or chainlike aluminum nanoparticles on the anode and a layer containing branched or chainlike aluminum nanoparticles on the cathode, versus electrochemical cells that do not have such layers on both the anode and the cathode.

Comparative cell 1 was prepared according to the following procedure. The anode was prepared by vacuum depositing lithium on to a 200 nm-thick copper current collector layer, which was on top of a polyethylene terephthalate (PET) substrate. The resulting vacuum deposited lithium (VDLi) layer had a thickness of 15 µm. The PET substrate was removed following the deposition of the lithium prior to assembly of the electrochemical cell. The cathode was prepared by coating $LiNi_{0.6}Co_{0.2}Mn_{0.2}O_2$ on to an aluminum metal substrate. A polyolefin (ENTEK EP 9 µm) was used as a porous separator. The anode, the separator, and the cathode were assembled in a layered structure in the order of anode/separator/cathode, and the resulting assembly was sealed in a foil pouch. After the assembly was sealed in the foil pouch, 0.55 mL of electrolyte (0.1 M $LiPF_6$ in a 1:4 mixture of fluoroethylene carbonate and dimethyl carbonate) was added to the pouch. The resulting cell package was then vacuum sealed. Following the vacuum sealing step, the resulting electrochemical cell was allowed to soak in the electrolyte for 24 hours without any pressure being applied to the cell. After the 24 hour period of soaking, a pressure of 12 kg/cm$^2$ was applied to the electrochemical cell using a pressure rig with flat pressure plates prior to initiating measurements and the pressure was maintained throughout the measurements.

Comparative cell 2 was prepared using the same procedure as comparative cell 1, except that prior to the assembly of the electrochemical cell, the VDLi anode was coated with a layer of aluminum nanoparticles formed using an electrical wire explosion method and having average particles sizes of 40-60 nm (as measured by a BET method) using the procedure described in Example 1. The resulting layer of branched or chainlike aluminum nanoparticles on the anode had a thickness of 2-4 µm.

Comparative cell 3 was prepared using the same procedure as comparative cell 1, except that prior to the assembly of the electrochemical cell the cathode was coated with a layer of aluminum nanoparticles formed using an electrical wire explosion method and having average particles sizes of 40-60 nm (as measured by a BET method) using a modified version of the procedure described in Example 1, where the cathode material was coated instead of the VDLi, and the solvent mixture used for the dispersion was PMA. The resulting layer of branched or chainlike aluminum nanoparticles on the cathode had a thickness of 5 µm.

Cell 1 was prepared using the same procedure as comparative cell 1, except that prior to the assembly of the electrochemical cell, the VDLi anode and the cathode were each coated with a layer of aluminum nanoparticles formed using an electrical wire explosion method and having average particles sizes of 40-60 nm (as measured by a BET method). The VDLi anode layer was coated using the procedure described in Example 1. The resulting layer of branched or chainlike aluminum nanoparticles on the anode had a thickness of 2-4 µm. The cathode was coated using a modified version of the procedure described in Example 1, where the cathode material was coated instead of the VDLi. The resulting layer of branched or chainlike aluminum nanoparticles on the cathode had a thickness of 5 µm.

Figure 8:
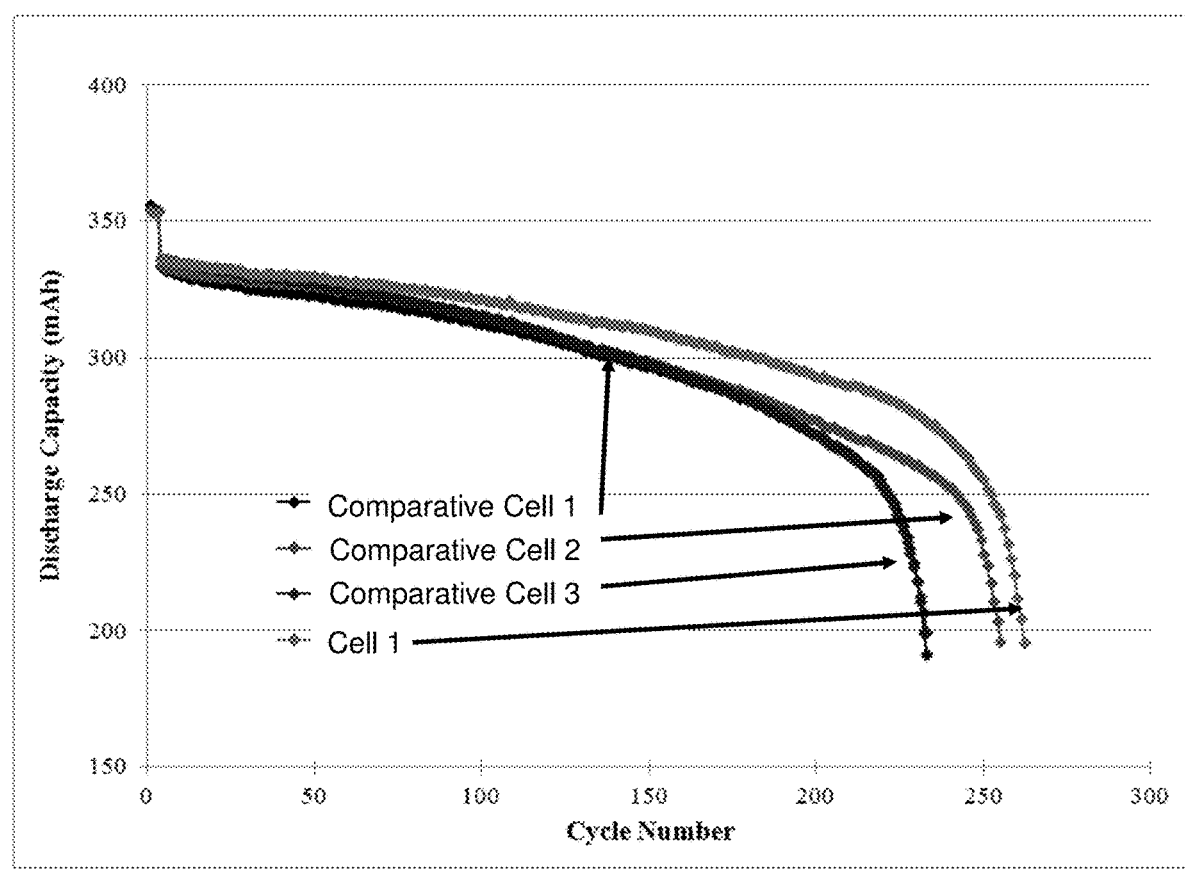
FIG. 8 is a plot showing discharge capacity as a function of number of charge-discharge cycles for electrochemical cells, according to certain embodiments.

FIG. 8 shows discharge capacity for each of comparative cell 1, comparative cell 2, comparative cell 3, and cell 1 as a function of number of charge-discharge cycles. The charge-discharge cycling measurements were performed while a 12 kg/cm$^2$ pressure was applied to the electrochemical cell. Prior to the charge-discharge cycling measurements, each electrochemical cell was conditioned with three charge-discharge cycles at standard rates of C/10 to charge and C/2.5 to discharge. During the charge-discharge cycling measurements shown in FIG. 8, the electrochemical cell was charged at a rate of C/4 and discharged at rate of 1 C. The charge cutoff voltage was 4.4 V followed by a taper at 4.4 V to a 1 mA current. The discharge cutoff voltage was 3.2 V. The results in FIG. 8 indicate that the presence of a layer of aluminum nanoparticles on only the cathode led to no improvement, as the data curve for comparative cell 3 overlapped with the curve for comparative cell 1. The results in FIG. 8 also show that the presence of a layer of aluminum nanoparticles on only the anode led to an improvement in performance, as can be seen by the greater number of cycles needed to reduce the discharge capacity of comparative cell 2 relative to comparative cell 1. The results in FIG. 8 show that the greatest improvement in performance was observed in cell 1, which had layers of aluminum nanoparticles on both the anode and the cathode.

Example 3

This example compares the charge-discharge cycling performance of an electrochemical cell that has a layer containing branched or chainlike aluminum nanoparticles on the anode, versus an electrochemical cell that contain layers of spherical aluminum nanoparticles on the anode.

Comparative cell 4 was prepared according to the following procedure. The anode was prepared by vacuum depositing lithium on to a 200 nm-thick copper current collector layer, which was on top of a polyethylene terephthalate (PET) substrate. The resulting vacuum deposited lithium (VDLi) layer had a thickness of 15 µm. The PET substrate was removed following the deposition of the lithium prior to assembly of the electrochemical cell. The cathode was prepared by coating $LiNi_{0.6}Co_{0.2}Mn_{0.2}O_2$ on to an aluminum metal substrate. A polyolefin (ENTEK EP 9 µm) was used as a porous separator. The anode, the separator, and the cathode were assembled in a layered structure in the order of anode/separator/cathode, and the resulting assembly was sealed in a foil pouch. After the assembly was sealed in the foil pouch, 0.55 mL of electrolyte (0.1 M $LiPF_6$ in a 1:4 mixture of fluoroethylene carbonate and dimethyl carbonate) was added to the pouch. The resulting cell package was then vacuum sealed. Following the vacuum sealing step, the resulting electrochemical cell was allowed to soak in the electrolyte for 24 hours without any pressure being applied to the cell. After the 24 hour period of soaking, a pressure of 12 kg/cm$^2$ was applied to the electrochemical cell using a pressure rig with flat pressure plates prior to initiating measurements and maintained throughout the measurements.

Comparative cell 5 was prepared using the same procedure as comparative cell 4, except that prior to the assembly of the electrochemical cell, the VDLi anode was coated with a layer of spherical aluminum nanoparticles having an average particle size of 60-80 nm (as measured by a BET method). The resulting layer of aluminum nanoparticles on the anode had a thickness of 2-4 µm. In the resulting layer, the aluminum nanoparticles did not form branched or chainlike structures.

Cell 2 was prepared using the same procedure as comparative cell 4, except that prior to the assembly of the electrochemical cell, the VDLi anode was coated with a layer of aluminum nanoparticles formed using an electrical wire explosion method and having average particles sizes of 40-60 nm (as measured by a BET method) using the procedure described in Example 1. The resulting layer of branched or chainlike aluminum nanoparticles on the anode had a thickness of 2-4 µm.

Figure 9:
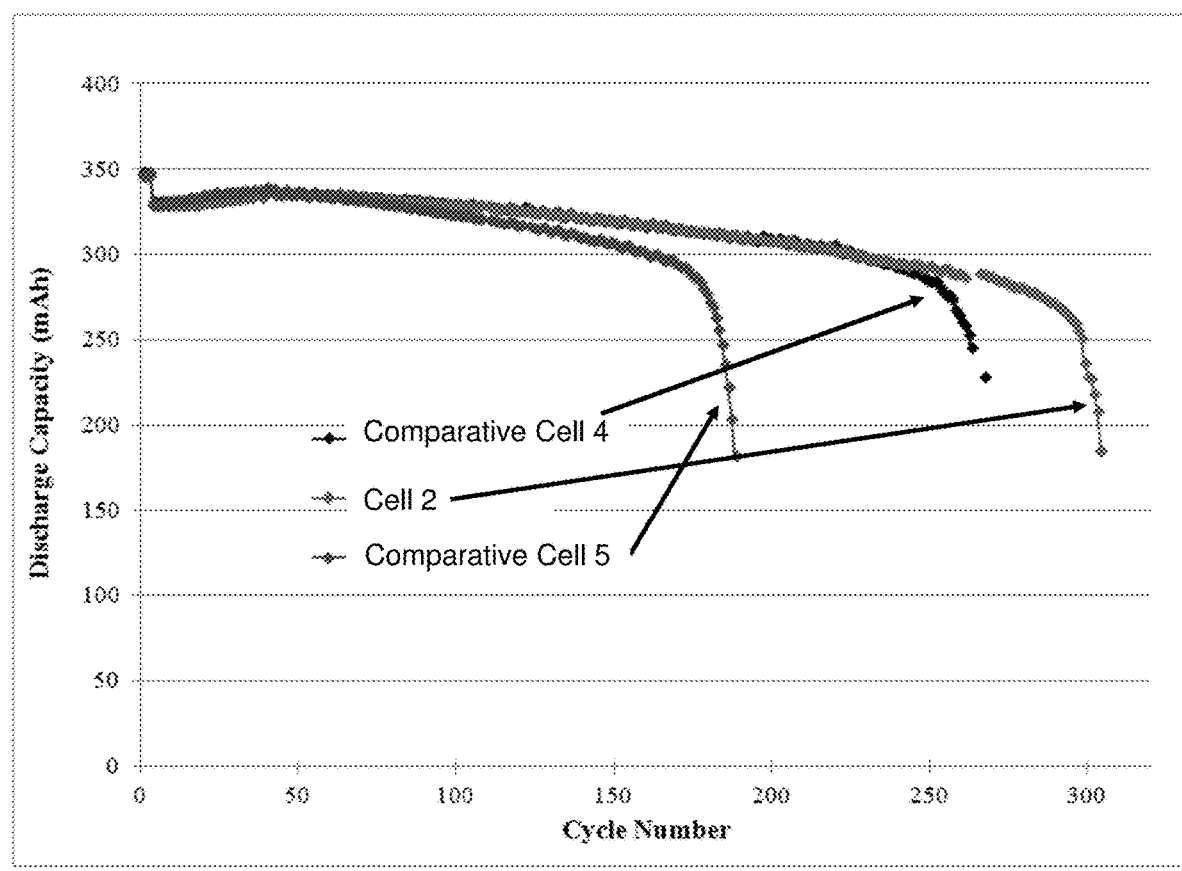
FIG. 9 is a plot showing discharge capacity as a function of number of charge-discharge cycles for electrochemical cells, according to certain embodiments.

FIG. 9 shows discharge capacity for each of comparative cell 4, comparative cell 5, and cell 2 as a function of number of charge-discharge cycles. The charge-discharge cycling measurements were performed while a 12 kg cm$^2$ pressure was applied to the electrochemical cell. Prior to the charge-discharge cycling measurements, each electrochemical cell was conditioned with three charge-discharge cycles at standard rates of C/10 to charge and C/2.5 to discharge. During the charge-discharge cycling measurements shown in FIG. 9, the electrochemical cell was charged at a rate of C/4 and discharged at a rate of 1 C. The charge cutoff voltage was 4.35 V followed by a taper at 4.35 V to a 1 mA current. The discharge cutoff voltage was 3.2 V. The results in FIG. 9 indicate that the presence of a layer of branched or chainlike aluminum nanoparticles on the VDLi anode (cell 2) led to an improvement in performance relative to the comparative cell 4 control, while the presence of a layer of spherical nanoparticles on the VDLi anode (comparative cell 5) led to worse performance relative to comparative cell 1.

Example 4

This example compares the charge-discharge cycling performance of an electrochemical cell that that has both a layer containing fumed silica on the anode and a layer containing fumed silica on the cathode, versus electrochemical cells that do not have such layers on both the anode and the cathode.

Comparative cell 6 was prepared according to the following procedure. The anode was prepared by vacuum depositing lithium on to a 200 nm-thick copper current collector layer, which was on top of a polyethylene terephthalate (PET) substrate. The resulting vacuum deposited lithium (VDLi) layer had a thickness of 15 µm. The PET substrate was removed following the deposition of the lithium prior to assembly of the electrochemical cell. The cathode was prepared by coating $LiNi_{0.6}Co_{0.2}Mn_{0.2}O_2$ on to an aluminum metal substrate. A polyolefin (ENTEK EP 9 µm) was used as a porous separator. The anode, the separator, and the cathode were assembled in a layered structure in the order of anode/separator/cathode, and the resulting assembly was sealed in a foil pouch. After the assembly was sealed in the foil pouch, 0.55 mL of electrolyte (0.1 M $LiPF_6$ in a 1:4 mixture of fluoroethylene carbonate and dimethyl carbonate) was added to the pouch. The resulting cell package was then vacuum sealed. Following the vacuum sealing step, the resulting electrochemical cell was allowed to soak in the electrolyte for 24 hours without any pressure being applied to the cell. After the 24 hour period of soaking, a pressure of 12 kg/cm$^2$ was applied to the electrochemical cell using a pressure rig with flat pressure plates prior to initiating measurements and maintained throughout the measurements.

Comparative Cell 7 was prepared using the same procedure as comparative cell 6, except that prior to the assembly of the electrochemical cell, the VDLi anode was coated with a layer of fumed silica (TS-720 purchased from Cabot Corporation) by following the same procedure as described for the aluminum nanoparticles in Example 1, except replacing the aluminum nanoparticles with the fumed silica. The resulting layer of fumed silica on the anode had a thickness of 2-4 µm.

Cell 3 was prepared using the same procedure as comparative cell 6, except that prior to the assembly of the electrochemical cell, the VDLi anode and the cathode were each coated with a layer of fumed silica (TS-720 purchased from Cabot Corporation). The VDLi anode layer was coated following the same procedure as described for the aluminum nanoparticles in Example 1, except replacing the aluminum nanoparticles with the fumed silica. The resulting layer of fumed silica on the anode had a thickness of 2-4 µm. The cathode was coated using a modified version of the procedure described in Example 1, where the cathode material was coated instead of the VDLi, and where the aluminum nanoparticles were replaced with the fumed silica. The resulting layer of fumed silica on the cathode had a thickness of 5 µm.

Figure 10:
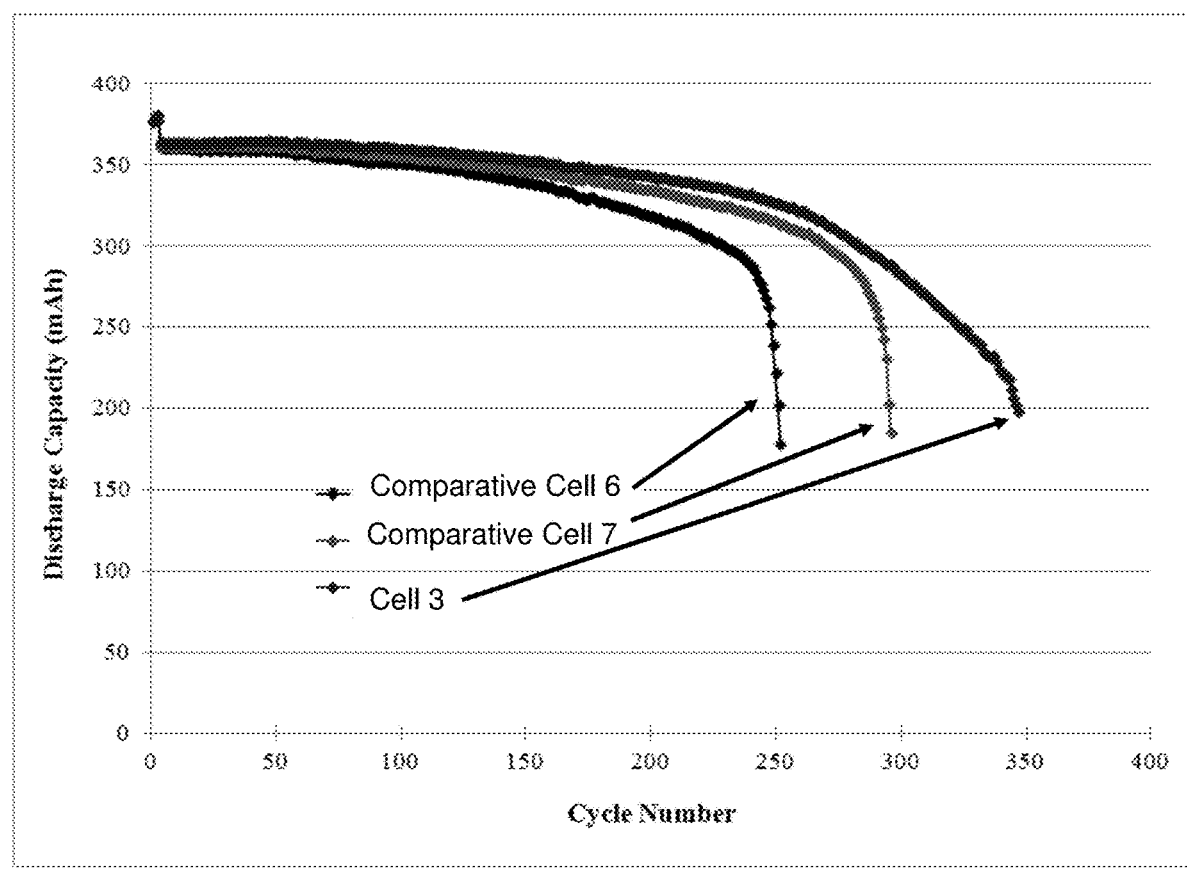
FIG. 10 is a plot showing discharge capacity as a function of number of charge-discharge cycles for electrochemical cells, according to certain embodiments.

FIG. 10 shows discharge capacity for each of comparative cell 6, comparative cell 7, and cell 3 as a function of number of charge-discharge cycles. The charge-discharge cycling measurements were performed while a 12 kg/cm$^2$ pressure was applied to the electrochemical cell. Prior to the charge-discharge cycling measurements, each electrochemical cell was conditioned with three charge-discharge cycles at standard rates of C/10 to charge and C/2.5 to discharge. During the charge-discharge cycling measurements shown in FIG. 10, the electrochemical cell was charged at a rate of C/4 and discharged at a rate of 1 C. The charge cutoff voltage was 4.4 V followed by a taper at 4.4 V to a 1 mA current. The discharge cutoff voltage was 3.2 V. The results in FIG. 10 show that the presence of a layer of fumed silica on only the anode led to an improvement in performance, as can be seen by the greater number of cycles needed to reduce the discharge capacity of comparative cell 7 relative to comparative cell 6. The results in FIG. 10 show that the greatest improvement in performance was observed in cell 3, which had layers of fumed silica on both the anode and the cathode.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical device, comprising:
   an anode;
   a cathode;
   a separator between the anode and the cathode;
   a first layer between the anode and the separator, the first layer comprising a first plurality of nanoparticles; and
   a second layer between the cathode and the separator, the second layer comprising a second plurality of nanoparticles;
   wherein:
      at least some of the nanoparticles of the first plurality of nanoparticles are in the form of a branched or chain-like structure,
      at least some of the nanoparticles of the second plurality of nanoparticles are in the form of a branched or chain-like structure, and
      the first plurality of nanoparticles and/or the second plurality of nanoparticles comprise fumed metal oxide particles and/or fumed metalloid oxide particles.

2. The electrochemical device of claim 1, wherein the first layer and/or the second layer has a porosity of at least 40% after experiencing an applied pressure of at least 12 kg/cm$^2$ for a period of 14 hours.

3. The electrochemical device of claim 1, wherein the first layer and the second layer each have a porosity of at least 40%.

4. The electrochemical device of claim 1, wherein the first layer and the second layer each have a porosity of at least 60%.

5. The electrochemical device of claim 1, wherein the first layer and the second layer each have a porosity of at least 80%.

6. The electrochemical device of claim 1, wherein the branched or chain-like structures of the first plurality of nanoparticles comprise aggregates and/or agglomerates of the nanoparticles of the first plurality of nanoparticles and/or wherein the branched or chain-like structures of the second plurality of nanoparticles comprise aggregates and/or agglomerates of the nanoparticles of the second plurality of nanoparticles.

7. The electrochemical device of claim 1, wherein the branched or chain-like structures of the first plurality of nanoparticles and/or second plurality of nanoparticles have an average length of at least 200 nm and less than or equal to 20 μm.

8. The electrochemical device of claim 1, wherein the branched or chain-like structures of the first plurality of nanoparticles and/or second plurality of nanoparticles have an aspect ratio of at least 2 and less than or equal to 20.

9. The electrochemical device of claim 1, wherein the first plurality of nanoparticles and/or second plurality of nanoparticles comprise Si, Al, Ti, Bi, Zn, Cr, Fe, Ge, Ni, Mo, Sn, Zr, V, W, Cu, Mn, Ce, Sb, or a combination thereof.

10. The electrochemical device of claim 1, wherein the first plurality of nanoparticles and/or the second plurality of nanoparticles comprise $SiO_2$.

11. The electrochemical device of claim 1, wherein the first plurality of nanoparticles and/or the second plurality of nanoparticles comprise aluminum metal.

12. The electrochemical device of claim 1, wherein the first plurality of nanoparticles and/or the second plurality of nanoparticles comprise a mixture of fumed metal oxide particles and/or fumed metalloid oxide particles and metallic nanoparticles.

13. The electrochemical device of claim 1, wherein the first plurality of nanoparticles and/or the second plurality of nanoparticles comprise a mixture of fumed silica particles and aluminum nanoparticles.

14. The electrochemical device of claim 1, wherein the thickness of the first layer and/or the second layer is greater than or equal to 100 nm and less than or equal to 20 μm.

15. The electrochemical device of claim 1, wherein the first plurality of nanoparticles and/or the second plurality of nanoparticles have a mean maximum cross-sectional dimension of greater than or equal to 20 nm and less than or equal to 1,000 nm.

16. The electrochemical device of claim 1, wherein the first plurality of nanoparticles and the second plurality of nanoparticles comprise fumed metal oxide particles and/or fumed metalloid oxide particles.

17. An electrochemical device, comprising:
an anode;
a cathode;
a separator between the anode and the cathode;
a first layer between the anode and the separator, the first layer comprising a first plurality of nanoparticles; and
a second layer between the cathode and the separator, the second layer comprising a second plurality of nanoparticles;
wherein:
the first layer and the second layer are porous,
at least some of the nanoparticles of the first plurality of nanoparticles are in the form of a branched or chain-like structure,
at least some of the nanoparticles of the second plurality of nanoparticles are in the form of a branched or chain-like structure, and
the first plurality of nanoparticles and/or the second plurality of nanoparticles are metallic.

* * * * *